(12) United States Patent
Tatsuno et al.

(10) Patent No.: US 8,022,347 B2
(45) Date of Patent: Sep. 20, 2011

(54) OPTICAL SCANNING DEVICE, IMAGE FORMING APPARATUS, AND OPTICAL SCANNING METHOD HAVING A PLURALITY OF LIGHT INTENSITY CONTROL DEVICES WITH A SWITCHING UNIT

(75) Inventors: Hibiki Tatsuno, Kanagawa (JP); Kenichi Ono, Tokyo (JP); Tomoaki Suga, Kanagawa (JP); Naoto Watanabe, Kanagawa (JP); Nobuyuki Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 299 days.

(21) Appl. No.: 12/486,806

(22) Filed: Jun. 18, 2009

(65) Prior Publication Data

US 2009/0314927 A1 Dec. 24, 2009

(30) Foreign Application Priority Data

Jun. 23, 2008 (JP) ................... 2008-163720
Jul. 28, 2008 (JP) ................... 2008-193167
Apr. 2, 2009 (JP) ................... 2009-090441

(51) Int. Cl.
*G01J 1/32* (2006.01)
(52) U.S. Cl. ........................ 250/205; 250/235
(58) Field of Classification Search ................ 250/205, 250/216, 208.1, 237 R, 235, 226; 359/196.1, 359/205.1, 212.1, 216.1, 900; 347/241, 129, 347/130, 134, 136
See application file for complete search history.

(56) References Cited

U.S. PATENT DOCUMENTS

| | | | |
|---|---|---|---|
| 1,348,387 A | 8/1920 | Armstrong | |
| 4,474,422 A * | 10/1984 | Kitamura | ................... 359/204.1 |
| 5,063,210 A | 11/1991 | Lange, III et al. | |
| 6,587,137 B2 | 7/2003 | Shinohara et al. | |
| 6,924,938 B2 | 8/2005 | Nishina et al. | |
| 7,081,913 B2 | 7/2006 | Ono | |
| 7,245,314 B2 | 7/2007 | Ono | |
| 7,292,612 B2 | 11/2007 | Ono | |
| 7,515,322 B2 | 4/2009 | Suga | |
| 7,545,547 B2 | 6/2009 | Hayashi et al. | |
| 2008/0055672 A1 | 3/2008 | Watanabe et al. | |
| 2008/0123159 A1 | 5/2008 | Hayashi et al. | |
| 2008/0192319 A1 | 8/2008 | Miyatake et al. | |
| 2008/0204840 A1 | 8/2008 | Watanabe et al. | |
| 2008/0204842 A1 | 8/2008 | Arai et al. | |
| 2008/0218723 A1 | 9/2008 | Ohide et al. | |
| 2008/0218827 A1 | 9/2008 | Watanabe et al. | |
| 2008/0219601 A1 | 9/2008 | Arai et al. | |
| 2008/0267662 A1 | 10/2008 | Arai et al. | |
| 2008/0285104 A1 | 11/2008 | Arai et al. | |
| 2009/0065685 A1 | 3/2009 | Watanabe et al. | |

FOREIGN PATENT DOCUMENTS

JP 2534656 6/1996

(Continued)

*Primary Examiner* — Que T Le
(74) *Attorney, Agent, or Firm* — Dickstein Shapiro LLP

(57) ABSTRACT

A surface-emitting laser array includes a plurality of surface-emitting laser devices arranged in an array. An optical system includes a plurality of optical devices to guide a light beam composed of lights emitted from the surface-emitting laser array to a target surface to be scanned. A light-intensity-control-device switching unit places one of light-intensity control devices having different light transmittances at a predetermined position in an optical path of the light beam.

20 Claims, 19 Drawing Sheets

FOREIGN PATENT DOCUMENTS

| | | |
|---|---|---|
| JP | 2000-241867 | 9/2000 |
| JP | 2001-305460 | 10/2001 |
| JP | 2002-341699 | 11/2002 |
| JP | 2003-260813 | 9/2003 |
| JP | 2006-235213 | 9/2006 |
| JP | 2008-33062 | 2/2008 |

* cited by examiner

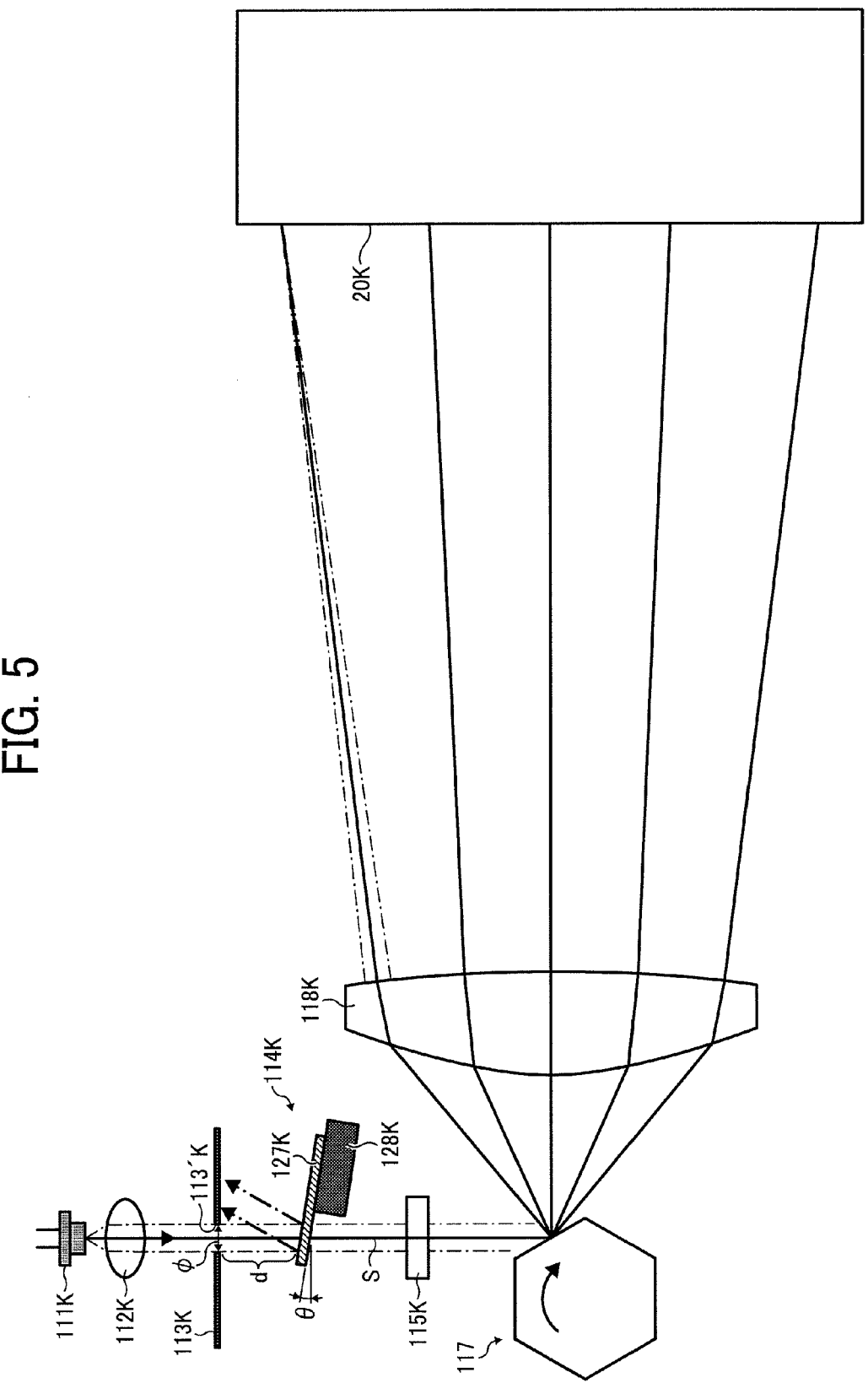

$\theta : \dfrac{\phi}{d} \leqq \tan(2\theta)$ $$\theta : \frac{a}{2} \cdot \frac{1}{b} \leqq \tan(2\theta)$$

$$\theta : \left(\frac{a}{2} - \Delta\right) \cdot \frac{1}{b} \leqq \tan(2\theta)$$

OPTICAL SCANNING DEVICE, IMAGE FORMING APPARATUS, AND OPTICAL SCANNING METHOD HAVING A PLURALITY OF LIGHT INTENSITY CONTROL DEVICES WITH A SWITCHING UNIT

CROSS-REFERENCE TO RELATED APPLICATIONS

The present application claims priority to and incorporates by reference the entire contents of Japanese priority document 2008-163720 filed in Japan on Jun. 23, 2008, Japanese priority document 2008-193167 filed in Japan on Jul. 28, 2008 and Japanese priority document 2009-090441 filed in Japan on Apr. 2, 2009.

BACKGROUND OF THE INVENTION

1. Field of the Invention

The present invention relates to a technology for scanning a target surface with a light emitted from a light source including a surface-emitting laser array.

2. Description of the Related Art

Conventionally, there are known optical scanning devices provided in image forming apparatuses such as copiers, facsimiles, printers, and optical plotters. The optical scanning device emits a light from a light source based on information corresponding to an image to be formed and scans a surface to be scanned on an image carrier with the emitted light. The optical scanning device is disclosed in, for example, Japanese Patent Application Laid-open No. 2008-033062, Japanese Patent Application Laid-open No. 2002-341699, and Japanese Patent Application Laid-open No.2003-260813. The optical scanning device disclosed therein includes an optical system that guides the light emitted from the light source to the surface to be scanned.

The optical system is formed with various optical devices such as a deflecting unit being a polygon mirror or the like, a cylindrical lens, and a scanning lens. However, the optical devices have variations in each optical characteristic such as light transmittance and light reflectance, and the optical characteristics vary depending on an incident angle of light on each optical device, or positions where the optical devices are arranged are difficult to be made perfectly identical to each other between optical scanning devices. From these reasons, even if the optical scanning devices having an identical configuration, there are variations in a ratio of an intensity of scanning light on the surface to be scanned to a light emission intensity of the light source, or in light-use efficiency.

Because the variation in the light-use efficiency may cause variation in the intensity of scanning light, and further cause variation in image quality, this doest not meet requirements for formation of high-quality images. Therefore, a technology for reducing the variation in the intensity of scanning light is proposed. The technology is such that the intensity of the scanning light is made uniform by giving a certain allowance to the light emission intensity of the light source and controlling the light emission intensity.

However, by using the technology, the light emission intensity is caused to decrease in any device with high light-use efficiency. If the light emission intensity is decreased, droop characteristics become worse, and light emitting properties of the light source may thereby become unstable. The unstable light emitting properties of the light source cause the light emission intensity to vary and a beam spot size to be degraded, which exerts an effect on an output image.

In contrast, there are known technologies for enabling reduction of the variation in the light-use efficiency itself. As one of the technologies is such that by reducing light transmittance of optical devices such as a cylindrical lens, the variation in the light-use efficiency is reduced (see, for example, Japanese Patent Application Laid-open No. 2008-033062). By minimizing the variation in the light-use efficiency itself, the light emission intensity of the light source does not have to be reduced to such an extent that the light emitting properties of the light source become unstable. It is therefore expected to reduce the effect exerted on the output image and also to minimize the variation in the light emission intensity.

Meanwhile, there is known a technology for actively changing a moving speed of an image carrier such as a photosensitive element and changing an image forming speed called "process speed" or the like in the image forming apparatus. Namely, there is known a technology in which when an image is to be formed on an OHP transparency or a thick paper by the image forming apparatus, the image forming speed is reduced more than a case in which an image is to be formed on a plain paper (see, for example, Japanese Patent Application Laid-open No. 2002-341699 and Japanese Patent Application Laid-open No. 2003-260813). This technology has advantages such that a bright image is obtained when an image is formed on a sheet such as the OHP transparency and such that glossiness is improved. Especially, when a color image is formed by superimposing toner images formed with different colors, such as yellow, magenta, cyan, and black, on one another, this technology is suitable for preventing color muddiness to obtain a bright image by preventing reflection on boundary between toner particles by reducing the image forming speed and sufficiently resolving toners of the colors.

As explained above, in the technology for changing the moving speed of the image carrier to change the image forming speed, it is important for prevention of a decrease in image quality to control an exposure amount of the image carrier according to the change in the moving speed. For example, if the rotational speed of the image carrier is reduced to one-half or one-third of an original speed, then it is required to reduce a light emission intensity and a light emission time of the light source, so that a light emission intensity in total is set to one-half or one-third of the original intensity. To control the exposure amount, a technology for controlling a light emission intensity of the light source in the optical scanning device is proposed (see, for example, Japanese Patent Application Laid-open No. 2002-062725), and a technology for intermittently using a polygon mirror is proposed (see, for example, Japanese Patent Application Laid-open No. 2003-260813).

However, these technologies cannot sometimes support the change in the moving speed of the image carrier. For example, in the former of these technologies, the droop characteristics may be worsen similarly to the technology, while in the latter of them, the control of the exposure amount cannot sometimes be dealt with by intermittently using the polygon mirror depending on how the moving speed of the image carrier is changed. Therefore, further development of the technologies is demanded.

Especially, when a surface-emitting laser array in which a plurality of surface-emitting laser devices are arranged is used as the light source, the problem may easily arise because of a narrow light output range.

When the surface-emitting laser array is used as the light source, because the light output range is narrow, the following problems may also arise. The problems include those in a case of correction of shading properties and a case of dealing with time degradation of the image carrier and environmental changes thereof.

The shading properties are explained below. Exposure intensities are nonuniform in each central portion and edges of the polygon mirror and optical devices in a main scanning direction due to their optical characteristics. The nonuniformity is comparatively large because it is caused by a product of the optical characteristics and the light-use efficiency. To correct the shading properties, it is necessary to change the output power of the light source so as to cancel out the comparatively high nonuniformity. However, if the light output range is narrow, then it is impossible to obtain the output power such that the nonuniformity is sufficiently canceled out.

The time degradation and environmental changes of the image carrier are explained below. The output power of the light source is determined after the device is assembled allowing for the light-use efficiency. The output power needs to be controlled according to situations when the device is actually used, allowing for the time degradation and environmental changes of the image carrier. The control is implemented by, for example, process control. However, the narrow light output range causes the control to be inadequately performed.

As a result of intense study, the inventors of the present invention have found that by controlling an exposure amount in the following manner, the control can support the change in the moving speed of the image carrier although there arises some problem as follows. The exposure amount is controlled by using a plurality of light-intensity control devices called "neutral density (ND) filters" with different light transmittances, selecting a light-intensity control device with an appropriate light transmittance according to the change in the moving speed of the image carrier, and causing the selected light-intensity control device to enter an optical path from the light source to the image carrier. It is noted that there is known a technology for selectively using the light-intensity control devices with different light transmittances in fields other than the field of optical scanning devices (see, for example, Japanese Patent Application Laid-open No. 2000-241867).

The problem is such that when a light-intensity control device is simply placed in the optical path, a reflected light by the light-intensity control device placed in the optical path may exert an effect on image formation. A technology for controlling a light emission intensity of the light source by detecting the intensity of light emitted from the light source is sometimes used in the optical scanning device. When this technology is used, the reflected light by the light-intensity control device is detected together with the light emitted from the light source, and control accuracy of the light emission intensity is thereby decreased, which causes uneven image density, to be affected on the image quality, and this is a problem. Further, if the reflected light enters the image carrier, then a so-called "ghost" image is formed, which affects the image quality, and this is also a problem. These problems may arise by the reflected light in the optical device also in the technology for reducing the light transmittance of the optical device such as the cylindrical lens.

Thus, when the light-intensity control devices with different light transmittances are selectively used, it is desirable to take these problems into consideration.

There are also known technologies allowing reduction of variations of the light-use efficiency itself, which are disclosed, for example, in Japanese Patent Application Laid-open No. 2008-033062, Japanese Patent Application Laid-open No. 2001-305460, and Japanese Patent Application Laid-open No. 2006-235213, and Japanese Patent No. 2534656. One of the technologies is a technology for reducing variation in the light-use efficiency by decreasing the light transmittance of the optical device such as the cylindrical lens (see, for example, Japanese Patent Application Laid-open No. 2008-033062). If the variation in the light-use efficiency itself is suppressed, the light emission intensity of the light source does not have to be reduced to such an extent that the light emitting properties of the light source become unstable. It is therefore expected to reduce the effect exerted on the output image and also to minimize the variation in the intensity of scanning light.

However, the technology for reducing the variation in the light-use efficiency by decreasing the light transmittance of the optical devices is designed to reduce the light transmittance of the optical devices originally provided in the optical system, in which target values of rates to reduce the light transmittance are equally set. Therefore, although a range of the variation in the light-use efficiency is decreased, the light-use efficiencies cannot be controlled according to actual values of the light-use efficiencies in the optical scanning devices, and thus, the intensity of scanning light may also be inadequately controlled.

For example, in an image forming apparatus that includes a plurality of image carriers and forms a color image as a composite image of images of the colors formed on the respective image carriers, the images of the colors need to be formed so as to achieve excellent quality of the image obtained as the composite image. To achieve the quality, the image carriers need to be scanned with respective intensity of scanning light suitable for obtaining such images of the colors as above. However, if the target values of the rates to decrease the light transmittances are equally set, then it is difficult to scan the image carriers with the respective intensity of scanning light suitable for obtaining such images of the colors as above, and therefore the quality of the image obtained as the composite image may possibly be decreased.

Meanwhile, a method of controlling the light transmittance includes a method of controlling light reflectances in a light-entrance side and in a light-exit side of the optical device. When the light reflectances in the both sides are to be controlled, each light-use efficiency is determined by a product of the respective reflectances. As a result of intense study, the inventors of the present invention have found that even if the light-use efficiencies are the same as each other, the intensity of so-called "ghost" light is changed due to a correlation between the reflectances in the light-entrance side and the light-exit side. The ghost light appears when the reflected light produced in the optical device is inclined with respect to the optical axis of an incident light, and the image carrier is thereby scanned at a position different from an original scanning position. Thus, the ghost light becomes a direct factor to cause irregularities in an image and therefore needs to be avoided as much as possible.

However, the ghost light appears not only when a light-incident plane and a light-exit plane of the optical device are curved and when these planes are intentionally inclined with respect to the optical axis of an incident light, but also when there is an error in installations of optical devices or the like. Therefore, the ghost light is difficult to be perfectly removed, and thus the intensity thereof is desirably reduced as much as possible. However, if, for example, the cylindrical lens is used to reduce the variation in the light-use efficiencies simply by reflection on the incident plane and the reflection plane, then this causes the intensity of the ghost light to be increased in addition to the problems, which is not preferred.

SUMMARY OF THE INVENTION

It is an object of the present invention to at least partially solve the problems in the conventional technology.

According to one aspect of the present invention, there is provided an optical scanning device that scans a target surface with a light beam. The optical scanning device includes a surface-emitting laser array including a plurality of surface-emitting laser devices arranged in an array; an optical system including a plurality of optical devices to guide a light beam composed of lights emitted from the surface-emitting laser array to a target surface to be scanned; a plurality of light-intensity control devices having different light transmittances; and a light-intensity-control-device switching unit that places one of the light-intensity control devices at a predetermined position in an optical path of the light beam.

Furthermore, according to another aspect of the present invention, there is provided an optical scanning method for an optical scanning device that includes a surface-emitting laser array including a plurality of surface-emitting laser devices arranged in an array, an optical system including a plurality of optical devices to guide a light beam composed of lights emitted from the surface-emitting laser array to a target surface to be scanned, and a plurality of light-intensity control devices having different light transmittances. The optical scanning method includes light-intensity-control-device switching including selecting one of the light-intensity control devices, and placing selected light-intensity control device at a predetermined position in an optical path of the light beam.

Moreover, according to still another aspect of the present invention, there is provided an image forming apparatus including an optical scanning device that includes a surface-emitting laser array including a plurality of surface-emitting laser devices arranged in an array, an optical system including a plurality of optical devices to guide a light beam composed of lights emitted from the surface-emitting laser array to a target surface to be scanned, a plurality of light-intensity control devices having different light transmittances, and a light-intensity-control-device switching unit that places one of the light-intensity control devices at a predetermined position in an optical path of the light beam; a scanning unit that scans the target surface with the light beam; and an image carrier that forms the target surface on which a latent image is formed by the light beam scanned by the scanning unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a plan view of how the optical scanning device provided in the image forming apparatus performs optical scanning;

DETAILED DESCRIPTION OF THE PREFERRED EMBODIMENTS

Exemplary embodiments of the present invention are explained in detail below with reference to the accompanying drawings.

Figure 1:
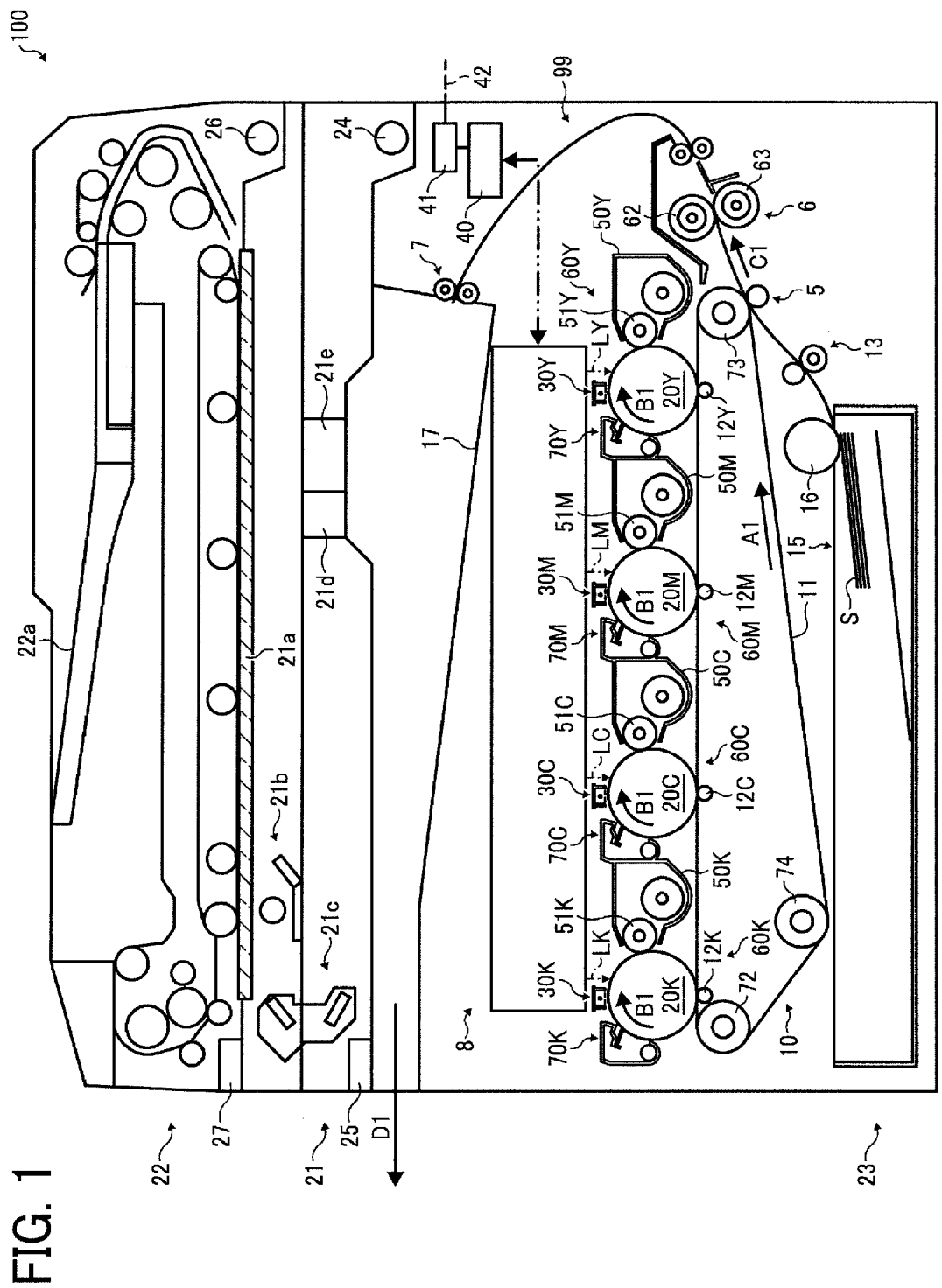
FIG. 1 is a schematic for explaining a configuration of an image forming apparatus that includes an optical scanning device according a first embodiment of the present invention.

FIG. 1 is a schematic of an image forming apparatus 100 that uses an optical scanning device according to a first embodiment of the present invention. The image forming apparatus 100 is a digital multifunction product including functions of a copier, a printer, and a facsimile, so that a full color image can be formed. The image forming apparatus 100 performs an image forming process based on image signals corresponding to image information received from an external device when it is used as the printer and the facsimile.

The image forming apparatus 100 can form an image on a sheet type recording medium being a transfer sheet or a recording paper, such as an ordinary plain paper used for copying or the like and also an overhead projector (OHP) sheet, a thick paper such as a card and a post card, and an envelop.

The image forming apparatus 100 includes a body 99 that occupies a central position in its vertical direction, a reading unit 21 as a scanner that is located above the body 99 and reads an original, an automatic document feeder (ADF) 22 that is located above the reading unit 21 and feeds the original placed thereon toward the reading unit 21, and a sheet feed unit 23 that is located in the lower side of the body 99 and functions as a paper feed table for storing therein a transfer sheet S being a transfer medium or a recording medium conveyed toward between photosensitive drums 20Y, 20M, 20C, and 20K and an intermediate transfer belt 11.

The image forming apparatus 100 is a tandem system or tandem type of image forming apparatus that has a tandem structure in which the photosensitive drums 20Y, 20M, 20C, and 20K are arranged in parallel to one another. Specifically, the photosensitive drums 20Y, 20M, 20C, and 20K are cylindrical photoconductive photosensitive elements which are latent-image carriers being a plurality of image carriers on which images corresponding to colors separated into yellow, magenta, cyan, and black can be formed.

The photosensitive drums 20Y, 20M, 20C, and 20K have an identical diameter and are arranged at an equal space therebetween along an outer peripheral side or an image forming side of the intermediate transfer belt 11 that is an endless intermediate transfer belt placed in nearly a central portion of the inside of the body 99.

The photosensitive drums 20Y, 20M, 20C, and 20K are arranged in parallel in this order from an upstream side thereof in an arrow A1 direction. The photosensitive drums 20Y, 20M, 20C, and 20K are provided in image stations 60Y, 60M, 60C, and 60K which are imaging units that form the images of yellow, magenta, cyan, and black, respectively.

The intermediate transfer belt 11 is movably provided along the arrow A1 direction while being opposed to the photosensitive drums 20Y, 20M, 20C, and 20K, respectively. Visible images or toner images formed on the photosensitive drums 20Y, 20M, 20C, and 20K are superposedly transferred to the intermediate transfer belt 11 moving along the arrow A1 direction, and are thereafter collectively transferred to the transfer sheet S.

The superimposed transfer of toner images to the intermediate transfer belt 11 is implemented so that the toner images formed on the photosensitive drums 20Y, 20M, 20C, and 20K are superposedly transferred to the same position of the intermediate transfer belt 11. Specifically, the superimposed transfer is implemented at transfer positions which are opposed positions between each of the photosensitive drums 20Y, 20M, 20C, and 20K and the intermediate transfer belt 11 while the intermediate transfer belt 11 is moving along the A1 direction by delaying a timing from an upstream side to a downstream side in the A1 direction in the following manner. That is, the transfer is implemented by applying each voltage to the photosensitive drums 20Y, 20M, 20C, and 20K by primary transfer rollers 12Y, 12M, 12C, and 12K being transfer chargers provided at respective opposed positions to the photosensitive drums 20Y, 20M, 20C, and 20K through the intermediate transfer belt 11.

The intermediate transfer belt 11 is an elastic belt of which entire layer is formed with an elastic material such as a rubber material. The intermediate transfer belt 11 may be a single-layer elastic belt, an elastic belt partially made of the elastic material, those using fluororesin, polycarbonate resin, polyimide resin, or the like, or may be a nonelastic belt.

The image forming apparatus 100 includes the four image stations 60Y, 60M, 60C, and 60K; a transfer belt unit 10 as a belt unit which is an intermediate transfer unit including the intermediate transfer belt 11 provided opposed to and below the photosensitive drums 20Y, 20M, 20C, and 20K; and a secondary transfer roller 5 that is a transfer unit or a paper transfer belt as a transfer member that is provided opposed to and is in contact with the intermediate transfer belt 11, and is made to rotate in the same direction as that of the intermediate transfer belt 11 at the position in contact therewith.

The image forming apparatus 100 also includes a cleaning unit (not shown) as an intermediate-transfer-belt cleaning unit that is provided opposed to the intermediate transfer belt 11 and includes an intermediate-transfer cleaning blade for cleaning the surface of the intermediate transfer belt 11; and an optical scanning device 8 that is a writing unit as an optical writing unit provided opposed to and above the image stations 60Y, 60M, 60C, and 60K.

The image forming apparatus 100 further includes a registration roller pair 13 that feeds a transfer sheet S conveyed from the sheet feed unit 23 toward a transfer portion between the intermediate transfer belt 11 and the secondary transfer roller 5 at a predetermined timing in synchronization with a timing of forming toner images by the photosensitive drums 20Y, 20M, 20C, and 20K respectively; and a sensor (not shown) that detects the fact that a trailing edge of the transfer sheet S reaches the registration roller pair 13.

The image forming apparatus 100 further includes a fixing unit 6 using a roller fixing system to fix toner images on the transfer sheet S that is transferred with the toner images, is conveyed in an arrow C1 direction, and enters the fixing unit 6; a paper ejection roller 7 that ejects the transfer sheet S having passed through the fixing unit 6 to the outside of the body 99; and a paper ejection tray 17 being a paper ejection unit that stacks thereon transfer sheets S to be ejected to the outside of the body 99 by the paper ejection roller 7 provided in an upper side of the body 99.

The image forming apparatus 100 further includes a central processing unit (CPU) and a memory (these are not shown); a control unit 40 that integrates the components of the image forming apparatus 100 and controls entire operations such as drive control for the optical scanning device 8; a communication control unit 41 that controls bi-directional communications with a higher-level device such as a personal computer connected to the image forming apparatus 100 through a network 42; and toner bottles (not shown) filled with toners of yellow, magenta, cyan, and black, respectively.

The image forming apparatus 100 is an in-body paper ejection type image forming apparatus in which the paper ejection tray 17 is located in the upper side of the body 99 and below the reading unit 21. Each of the transfer sheets S stacked on the paper ejection tray 17 is taken out in the downstream side in a D1 direction corresponding to the left side in FIG. 1.

The transfer belt unit 10 includes, in addition to the intermediate transfer belt 11, the primary transfer rollers 12Y, 12M, 12C, and 12K; a drive roller 72; a transfer entrance roller 73 being a secondary-transfer opposed roller; and a tension roller 74 being a driven roller, each on which the intermediate transfer belt 11 is wound. The drive roller 72 is driven to rotate by the drive of a motor as a drive source (not shown), and the intermediate transfer belt 11 is thereby driven to rotate in the A1 direction.

The fixing unit 6 includes a fixing roller 62 that has a heat source inside thereof, and a pressing roller 63 in press contact with the fixing roller 62. In the fixing unit 6, the transfer sheet S with toner images carried thereon is passed through a fixing portion or a press-contact portion between the fixing roller 62 and the pressing roller 63, so that the carried toner images are fixed on the surface of the transfer sheet S under heat and pressure.

The optical scanning device 8 scans surfaces to be scanned of the photosensitive drums 20Y, 20M, 20C, and 20K and exposes the surfaces thereof, and emits beams LY, LM, LC, and LK which are laser beams based on image signals to form electrostatic latent images respectively. The beams LY, LM, LC, and LK are such that electronic information corresponding to images to be formed are converted into optical information, and the optical scanning device 8 fixes the optical information as latent images on the photosensitive drums 20Y, 20M, 20C, and 20K, respectively.

The optical scanning device 8 is detachably attached to the body 99. When it is detached from the body 99, process cartridges (explained later) provided in the image stations 60Y, 60M, 60C, and 60K can be individually taken out upward from the body 99.

The sheet feed unit 23 includes a paper feed tray 15 on which transfer sheets S are stacked, and a paper feeding roller 16 that feeds out the transfer sheet S on the paper feed tray 15.

The reading unit 21 is located above the body 99, and is pivotally integrated to the body 99 by a shaft 24 provided at an edge of the reading unit 21 in the upstream side in the D1 direction of the image forming apparatus 100, so that the reading unit 21 is openable and closable with respect to the body 99.

The reading unit 21 has a holding portion 25 that is provided at an edge of the reading unit 21 in the downstream side in the D1 direction and that is held when the reading unit 21 is opened with respect to the body 99. The reading unit 21 is pivotal around the shaft 24, and by holding the holding portion 25 and pivoting the reading unit 21 upwardly, and the reading unit 21 is opened with respect to the body 99. An opening angle of the reading unit 21 with respect to the body 99 is nearly 90 degrees, so that an access to the inside of the body 99 and a closing operation of the reading unit 21 are made easy.

The reading unit 21 includes a contact glass 21a on which an original is set; a first carriage 21b provided with a light source (not shown) which irradiates light on the original set on the contact glass 21a and also provided with a first reflector (not shown) that reflects light irradiated from the light source to the original and reflected by the original, and moving in a horizontal direction in FIG. 1; a second carriage 21c provided with a second reflector (not shown) that reflects the light reflected by the first reflector of the first carriage 21b; an imaging lens 21d used to form the light from the second carriage 21c as an image; and a reading sensor 21e that receives the light having passed through the imaging lens 21d to thereby read a content of the original.

The ADF 22 is located above the reading unit 21 and is pivotally integrated to the reading unit 21 by a shaft 26 provided at an edge of the ADF 22 in the upstream side in the D1 direction of the image forming apparatus 100, so that the ADF 22 is openable and closable with respect to the reading unit 21.

The ADF 22 has a holding portion 27 that is located at an edge of the ADF 22 in the downstream side in the D1 direction and that is held when the ADF 22 is opened with respect to the reading unit 21. The ADF 22 is pivotal around the shaft 26, and by holding the holding portion 27 and pivoting the ADF 22 upwardly, so that it is open with respect to the reading unit 21 to thereby expose the contact glass 21a.

The ADF 22 includes an original tray 22a on which an original is set, and a drive unit that includes a motor (not shown) and feeds the set original. When copying is performed using the image forming apparatus 100, an original is set on the original tray 22a of the ADF 22, or the ADF 22 is pivoted upwardly, an original is set on the contact glass 21a and the ADF 22 is closed manually, and the original is pushed onto the contact glass 21a. An opening angle of the ADF 22 with respect to the reading unit 21 is nearly 90 degrees, so that setting the original on the contact glass 21a and maintenance of the contact glass 21a are made easy.

The control unit 40 includes a central processing unit (CPU) as an information computing unit and a memory as a storage unit. The control unit 40 performs so-called process control to appropriately maintain each density or the like of the toner images formed in the image stations 60Y, 60M, 60C, and 60K, according to temporal changes in characteristics of the photosensitive drums 20Y, 20M, 20C, and 20K and to environmental changes. The control unit 40 subjects the toner images to shading correction according to shading properties in the main scanning direction of the photosensitive drums 20Y, 20M, 20C, and 20K.

Referring to FIG. 1, a configuration of the image station 60Y, as a typical one of the image stations 60Y, 60M, 60C, and 60K, that includes the photosensitive drum 20Y is explained below. Because configurations of the other image stations are substantially identical to one another, in the followings, reference numerals corresponding to those added to components of the image station 60Y are assigned to the components of the other image stations for simplicity in explanation, and detailed explanations for the assigned numerals are omitted if not necessary. Letters Y, M, C, K added to the ends of the numerals indicate the components to form images of yellow, magenta, cyan, and black, respectively.

The image station 60Y provided with the photosensitive drum 20Y includes the primary transfer roller 12Y, a cleaning unit 70Y that cleans the photosensitive drum 20Y, a charging unit 30Y as a charging charger that charges the photosensitive drum 20Y to a high voltage, and a developing unit 50Y that develops the photosensitive drum 20Y, each of which are arranged around the photosensitive drum 20Y along its rotating direction B1 being the clockwise direction in FIG. 1. The developing unit 50Y includes a developing roller 51Y provided at a position opposed to the photosensitive drum 20Y.

The photosensitive drum 20Y, the cleaning unit 70Y, the charging unit 30Y, and the developing unit 50Y are integrally configured to form a process cartridge. The process cartridge is detachably attached to the body 99. The process cartridge obtained in the above manner can be handled as a replaceable component, so that maintainability thereof is significantly improved, which is extremely preferable.

With the configuration as above, the surface of the photosensitive drum 20Y is uniformly charged by the charging unit 30Y following a rotation of the photosensitive drum 20Y in the B1 direction, to form an electrostatic latent image corresponding to yellow on the surface thereof by performing exposure scanning with the beam LY emitted from the optical scanning device 8. The electrostatic latent image is formed by scanning the beam LY in the main scanning direction being a vertical direction with respect to the plane of paper and also by scanning it in a sub-scanning direction being a circumferential direction of the photosensitive drum 20Y by a rotation thereof in the B1 direction.

Charged toner of a yellow color supplied by the developing unit 50Y is caused to adhere to the electrostatic latent image formed in the above manner, and the latent image is developed to the yellow color to be visualized. The toner image as a yellow visible image obtained by the development is primarily transferred by the primary transfer roller 12Y to the intermediate transfer belt 11 that moves along the A1 direction, foreign matters such as residual toner after transfer are scraped off and removed by the cleaning unit 70Y, and are stored. Then, the photosensitive drum 20Y is prepared for next charging by the charging unit 30Y.

Likewise, toner images of the respective colors are formed in the other photosensitive drums 20M, 20C, and 20K, and the formed toner images are sequentially primarily transferred, by the primary transfer rollers 12M, 12C, and 12K respectively, to the same position on the intermediate transfer belt 11 that moves along the A1 direction. It is noted that the toner images of the respective colors have excellent toner density without uneven density and the ghost image is therefore prevented or suppressed in the manner as explained later.

The toner images superimposed on the intermediate transfer belt 11 are moved to a secondary transfer portion being an opposed position to the secondary transfer roller 5 following the rotation of the intermediate transfer belt 11 in the A1 direction, and the toner images are secondarily transferred to the transfer sheet S at the secondary transfer portion.

The transfer sheet S conveyed to the position between the intermediate transfer belt 11 and the secondary transfer roller 5 is fed out from the sheet feed unit 23, and is fed by the registration roller pair 13 at a timing in which the leading edge of the toner images on the intermediate transfer belt 11 is opposed to the secondary transfer roller 5, based on a detection signal detected by the sensor.

The toner images of all the colors are collectively transferred to the transfer sheet S, and the transfer sheet S with the toner images carried thereon are conveyed in the C1 direction to enter the fixing unit 6. When the transfer sheet S passes through a fixing portion between the fixing roller 62 and the pressing roller 63, the toner images on the transfer sheet S are fixed thereon under heat and pressure, and a color image being a composite color image is formed on the transfer sheet S through the fixing process. The color image is high quality because of the toner images of the respective colors excellent in toner density.

The transfer sheet S having passed through the fixing unit 6 to fix the toner images thereon passes through the paper ejection roller 7 to be stacked on the paper ejection tray 17. Meanwhile, the intermediate transfer belt 11 with which the secondary transfer is finished is cleaned by the cleaning unit, to be prepared for next primary transfer.

As explained above, the image forming apparatus 100 can form an image on not only a plain paper, but also an OHP transparency, a thick paper such as a card and a post card as the transfer sheet S. A heat absorption amount of the OHP transparency and the thick paper is large upon fixture as compared with that of the plain paper. Therefore, to perform satisfactory fixing and form an image with high quality, it is desirable to reduce a conveying speed in the fixing unit 6. Particularly, the case of forming an image on the OHP transparency has advantages such that a bright image is obtained and glossiness is improved by reducing the fixing speed and increasing the amount of heat to be given. In particular, when a color image is formed by superimposing toner images formed with different colors, such as yellow, magenta, cyan, and black, on one another, by sufficiently resolving toners of the colors due to reduction in the fixing speed and by preventing reflection on boundary between toner particles, a bright image in which color muddiness is prevented or suppressed is obtained.

As a result, the image forming apparatus 100 is designed to change the fixing speed according to a type of transfer sheet S.

However, if only the fixing speed is reduced in each image forming process, it becomes difficult to continuously perform image formation. Therefore, the image forming apparatus 100 is configured to change the fixing speed according to the type of transfer sheet S and also to change the moving speed of the intermediate transfer belt 11 and the photosensitive drums 20M, 20C, and 20K according to the change of the fixing speed. That is, the image forming apparatus 100 is configured to change the image forming speed i.e. the process speed according to the type of transfer sheet S.

Meanwhile, the speed-up of image formation is required in recent years. Especially, when a mono-color image is to be formed with only black, the speed-up is highly required. Therefore, the image forming apparatus 100 is configured to perform the mono-color image formation at a high speed when the transfer sheet S is a plain paper.

From these reasons, the image forming apparatus 100 has four modes: a mode to form a mono-color image on a plain paper, a mode to form a color image on a plain paper, a mode to form an image on an OHP transparency, and a mode to form an image on a thick paper. Image forming speeds are set to V1(=100 mm/sec), V2(=50 mm/sec), V3(=40 mm/sec), and V4(=33 mm/sec), respectively, according to these modes in this order.

Thus, the moving speeds i.e. the rotational speeds of the photosensitive drums 20Y, 20M, 20C, and 20K, the intermediate transfer belt 11, and developing rollers 51Y, 51M, 51C, and 51K are set to V1, V2, V3, and V4, and the fixing speeds or the like are also set to V1, V2, V3, and V4, respectively, according to these modes. The control unit 40 recognizes in which of the modes an image is formed, and also switches the speeds.

As explained above, if the moving speed of the photosensitive drums 20Y, 20M, 20C, and 20K is changed to change the image forming speed, control of exposure amounts of the photosensitive drums 20Y, 20M, 20C, and 20K according to the change in the moving speed is important to prevent degradation of image quality. Thus, writing of latent images to the surfaces of the photosensitive drums 20Y, 20M, 20C, and 20K by the optical scanning device 8 is performed by changing the light intensity according to the modes. Therefore, a technology as explained below is used in the optical scanning device 8.

The optical scanning device 8 is explained in detail below.

Figure 2:
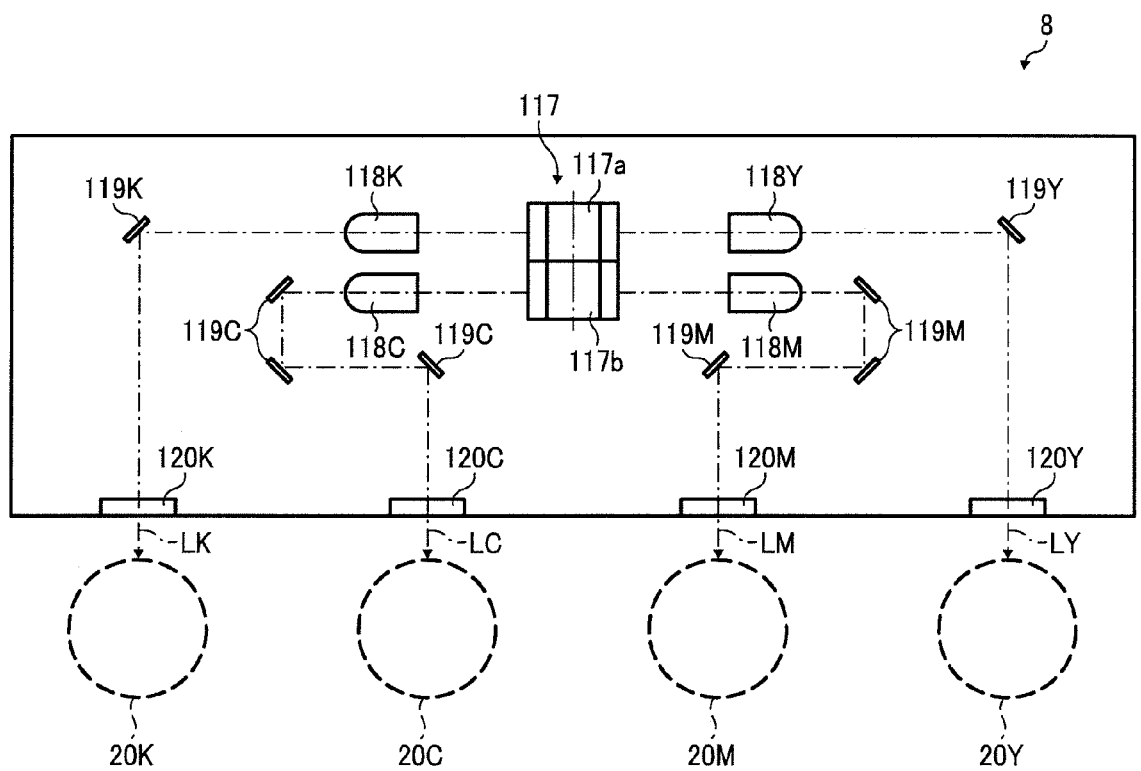
FIG. 2 is a schematic for explaining a partial structure of the optical scanning device provided in the image forming apparatus.

FIG. 2 is a schematic of the optical scanning device 8 as viewed from the same direction as shown in FIG. 1. The optical scanning device 8 includes an optical deflecting unit 117 which is a deflecting unit as a scanning unit provided at a central portion in the horizontal direction in FIG. 2, and, therefore, has a symmetric structure with respect to the optical deflecting unit 117 as the center in the horizontal direction in FIG. 2.

Figure 3:
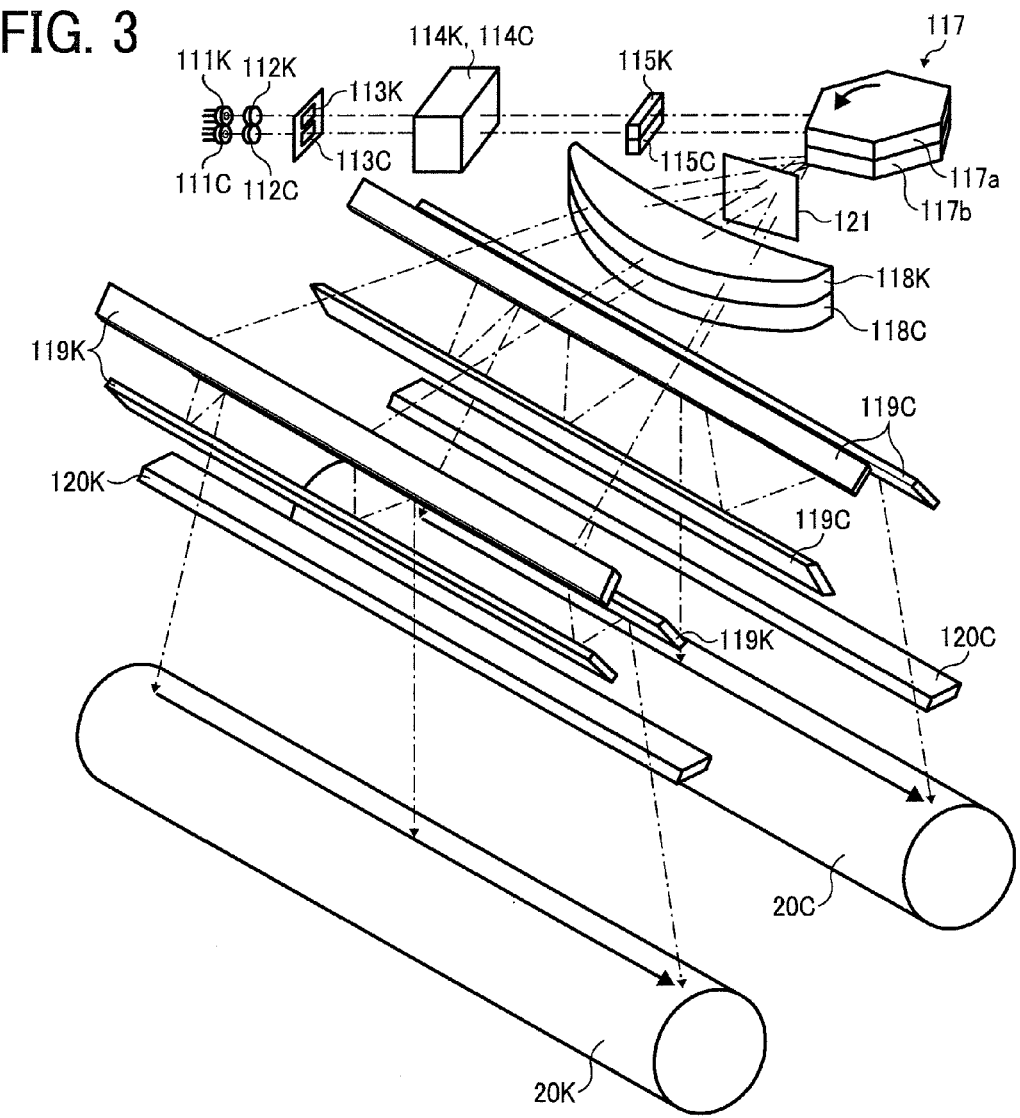
FIG. 3 is a schematic for explaining another partial structure of the optical scanning device provided in the image forming apparatus.

FIG. 3 represents a structure, of a whole structure of the optical scanning device 8, on the left side from the optical deflecting unit 117 in the horizontal direction in FIGS. 1 and 2. As explained above, because the optical scanning device 8 is symmetrically structured with respect to the optical deflecting unit 117 in the horizontal direction, the structure of the optical scanning device 8 is explained with reference to FIG. 3, and explanation of a structure on the right side from the optical deflecting unit 117 in the horizontal direction is omitted if not necessary by assigning corresponding numerals to FIG. 2. FIG. 2 represents a part of the structure as shown in FIG. 3.

Referring to FIG. 3, reference numerals 111K and 11C represent semiconductor lasers using a surface-emitting laser array in which a plurality of surface-emitting laser devices (not shown) are set in array.

The surface-emitting laser array has advantages such that a high-quality image can be obtained at a high speed. As the surface-emitting laser array, a vertical-cavity surface-emitting laser (VCSEL) is preferably used because a large number of light emitting points that emit light beams can be easily formed on a single device. This allows simultaneous writing to one image carrier with a large number of light beams. If "n" light beams are used for simultaneous writing, an area where a latent image is formed becomes n times and a time required for image formation becomes one n-th as compared with a case in which writing is performed using a light source that emits a single light beam. Furthermore, writing density can also be enhanced while maintaining or improving a writing speed. Thus, the VCSEL is used as the light source to thereby obtain a high-quality image at a high speed.

The VCSEL has disadvantageous characteristics in an output power range or the like as compared with an ordinary laser diode, however, these characteristics will be resolved by a light-intensity control device explained later. Specifically, in the ordinary laser diode used in any optical scanning device such as the optical scanning device 8, an output power range suitable for writing is about 4 milliwatts to 15 milliwatts, while in the VCSEL, the output power range is about 0.5 milliwatt to 1.2 milliwatts, and thus, achievement of a higher output power and an increase in the output power range are tasks to be solved. A low output power can be dealt with by increasing the sensitivity of the photosensitive element. However, there is a case in which a lower-power light is required, and in this case, if the VCSEL is used at a low output power, a divergence angle of light becomes unstable, which causes uneven density or the like of an image. Besides, the output power range of the VCSEL is difficult to be increased in terms of the structure of the device.

However, if the light-intensity control device as explained later is used, an actual light intensity can be reduced while using the VCSEL at a high output power. For example, when a light intensity of 0.3 milliwatt is required, and if the VCSEL is emitted so as to obtain the light intensity of 0.3 milliwatt, the characteristics may be decreased. However, by emitting the VCSEL so as to obtain a light intensity of 0.6 milliwatt at which the characteristics are not decreased and using the light-intensity control device with a transmittance of 0.5, the light intensity of 0.3 milliwatt is obtained as a result, and a stable image can be obtained.

Figure 4:
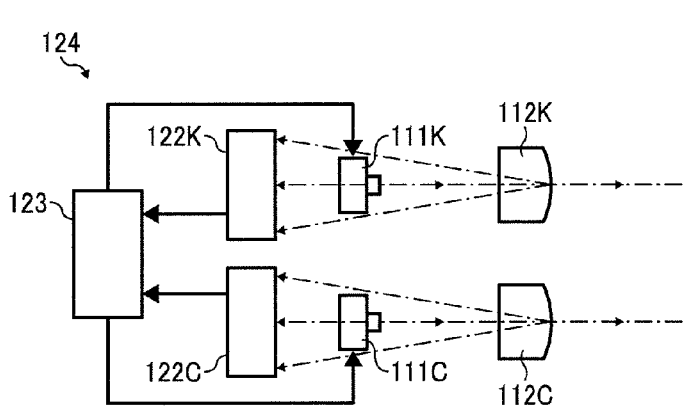
FIG. 4 is a block diagram of a schematic configuration of a control system of the optical scanning device provided in the image forming apparatus.

The semiconductor lasers 111K and 111C respectively include single light sources, and the light sources emit single light beams to scan the photosensitive drums 20K and 20C, respectively. As shown in FIG. 4, the semiconductor lasers 111K and 111C also emit light beams, different from the light beams to scan the photosensitive drums 20K and 20C, in an opposite direction to the light beams, with the same intensity as that of the light beams or with the intensity at a predetermined ratio with respect to the intensity of the light beams. The emitted light beams are detected by light-intensity detecting units 122K and 122C, respectively, shown in FIG. 4 and explained later. Further, the semiconductor lasers 111K and 111C can modulate or can control the intensity of the emitted light beams or the light intensity, and both of the semiconductor lasers are held in holders (not shown).

As shown in FIG. 3, each of the light beams emitted from the semiconductor lasers 111K and 111C is coupled by a coupling lens 112K or 112C formed with a collimator lens, and is converted to a parallel light flux which is a form of light flux suitable for an optical system in the downstream side of the coupling lens 112K or 112C. It is noted that the coupling lenses 112K and 112C may convert the light beams emitted from the semiconductor lasers 111K and 111C to a weak-divergent light flux or a weak-convergent light flux, respectively.

Each of the light beams having passed through the coupling lenses 112K and 112C and becoming a parallel light flux that is a desired form of a light flux passes through aperture 113K or 113C as the first aperture that is an aperture stop for controlling the width of the light beam or controlling the size of the light beam. During passage of the light beams through the apertures 113K and 113C, the light beams are beam-shaped and each beam diameter is stabilized. Thereafter, each of the light beams is caused to pass through the light-intensity control device occupying a predetermined position, as explained later, by light-intensity-control-device switching unit 114K or 114C, enters a cylindrical lens 115K or 115C, is converged in the sub-scanning direction by functions of the cylindrical lens 115K or 115C, and is formed as a line image elongated in the main scanning direction near a deflecting reflective facet of the optical deflecting unit 117.

The coupling lens 112K, the aperture 113K, the light-intensity-control-device switching unit 114K, and the cylindrical lens 115K are structured as a set of a pre-deflecting unit optical system that guides the light beam emitted from the semiconductor laser 111K being the light source to the optical deflecting unit 117. The coupling lens 112C, the aperture 113C, the light-intensity-control-device switching unit 114C, and the cylindrical lens 115C are structured as a set of a pre-deflecting unit optical system that guides the light beam emitted from the semiconductor laser 111C being the light source to the optical deflecting unit 117. Further, the coupling lens 112K and the coupling lens 112C form first optical systems respectively. The first optical systems couple the light beams or light fluxes emitted from the semiconductor lasers 111K and 111C, respectively. The cylindrical lens 115K and the cylindrical lens 115C form second optical systems respectively. The second optical systems converge the light beams or the light fluxes received from the coupling lens 112K and the coupling lens 112C being the first optical systems respectively, so as to form substantially linear shape elongated in the main scanning direction.

In FIG. 3, reference numeral 121 represents a soundproof glass provided in a window of a soundproof housing (not shown) of the optical deflecting unit 117. The light beam reflected by an incident mirror enters the optical deflecting unit 117, where it is deflected, and the deflected light beam is output to the side of a scanning-imaging optical system through the soundproof glass 121. The optical deflecting unit 117 includes a rotating polygon mirror 117a as an upper polygon mirror and a rotating polygon mirror 117b as a lower polygon mirror which are vertically layered in two stages in a rotating axis direction and are integrated into one unit. The rotating polygon mirrors 117a and 117b are formed each as a deflective optical device having six deflecting reflective facets in this example, and both of them have identical shape.

In FIG. 3, reference numerals 118K and 118C represent scanning lenses; 119K and 119C, optical-path bending mirrors; and 120K, 120C, dustproof glasses, respectively. The dustproof glasses 120K and 120C are dustproof members which are arranged to prevent entering of dust into the optical scanning device 8.

The scanning lens 118K and the optical-path bending mirror 119K form a set of scanning-imaging optical system that guides the light beam deflected by the rotating polygon mirror 117a of the optical deflecting unit 117 or guides the light beam emitted from the semiconductor laser 111K to the photosensitive drum 20K being a corresponding optically scanning position to form a light spot thereon. The scanning lens 118C and the optical-path bending mirror 119C form a set of scanning-imaging optical system that guides the light beam deflected by the rotating polygon mirror 117b of the optical deflecting unit 117 or guides the light beam emitted from the semiconductor laser 111C to the photosensitive drum 20C being a corresponding optically scanning position to form a light spot thereon. Each of the dustproof glasses 120K and 120C is parallel plates each of which entrance and exit planes of the light beam have no curvature and have no power on the light beam incoming into or outgoing from the corresponding plane, and are therefore not included in the scanning-imaging optical system.

As explained above, the light beam deflected by the rotating polygon mirror 117a of the optical deflecting unit 117 passes through the scanning-imaging optical system including the scanning lens 118K and through the dustproof glass 120K, and reaches the photosensitive drum 20K, to scan the photosensitive drum 20K. The light beam deflected by the rotating polygon mirror 117b of the optical deflecting unit 117 passes through the scanning-imaging optical system including the scanning lens 118C and through the dustproof glass 120C, and reaches the photosensitive drum 20C, to scan the photosensitive drum 20C. The scanning lens 118K and the scanning lens 118C form third optical systems, respectively. The third optical systems converge deflected light fluxes deflected by the rotating polygon mirrors 117a and 117b to the photosensitive drums 20K and 20C, respectively.

The pre-deflecting unit optical system including the coupling lens 112K, the optical deflecting unit 117, and the scanning-imaging optical system including the scanning lens 118K form a set of optical system that guides the light beam emitted from the semiconductor laser 111K to the photosensitive drum 20K so as to scan the photosensitive drum 20K therewith. The pre-deflecting unit optical system including the coupling lens 112C, the optical deflecting unit 117, and the scanning-imaging optical system including the scanning lens 118C form a set of optical system that guides the light beam emitted from the semiconductor laser 111C to the photosensitive drum 20C so as to scan the photosensitive drum 20C therewith. Because these optical systems are identically structured to each other, only one of them is explained, and explanation of the other one is therefore omitted.

As shown in FIG. 4, the optical scanning device 8 includes a light-intensity control unit 124 that includes the light-intensity detecting units 122K and 122C and a light-intensity control unit 123. Specifically, the light-intensity detecting units 122K and 122C detect light intensities i.e. light intensity of emitted light beams or the like that are emitted rearwardly from the semiconductor lasers 111K and 111C, respectively. The light-intensity control unit 123 is implemented as a part of functions of the control unit 40 that controls the light intensity i.e. light intensity of the light beams emitted from the semiconductor lasers 111K and 111C toward the photosensitive drums 20K and 20C, to maintain each intensity of the light beams for scanning the photosensitive drums 20K and 20C to a predetermined range based on each light intensity or intensity of the light beams detected by the light-intensity detecting units 122K and 122C, respectively.

The light-intensity detecting units 122K and 122C detect emitted light beams that are emitted rearwardly from the semiconductor lasers 111K and 111C, respectively. The light-intensity control unit 123 provides feedback control called auto power control (APC) in such a manner that drive currents for the semiconductor lasers 111K and 111C are controlled so as to obtain predetermined values based on each intensity of the light beams detected by the light-intensity detecting units 122K and 122C, respectively.

Actually, however, the light-intensity detecting units 122K and 122C also detect scattered beams produced when the light beams pass through at least a part of the optical systems such as the coupling lenses 112K and 112C, in addition to the emitted light beams emitted rearwardly from the semiconductor lasers 111K and 111C, respectively. Therefore, each of the light-intensity detecting units 122K and 122C detects the intensity of the sum of these beams. The light-intensity detecting units 122K and 122C can also detect scattered beams produced in the light-intensity-control-device switching units 114K and 114C in addition to at least a part of the optical system. However, the light-intensity detecting units 122K and 122C do not always detect all the scattered beams produced when the light beams pass through the optical systems and the light-intensity-control-device switching units 114K and 114C. In addition, even if the scattered beams produced when the light beams pass through the light-intensity-control-device switching units 114K and 114C are detected by the light-intensity detecting units 122K and 122C respectively, the scattered beams are prevented or controlled to be negligible, as explained later.

The light-intensity-control-device switching units 114K and 114C are provided so as to control each exposure amount of the photosensitive drums 20K and 20C according to the four modes. Because the structures of the light-intensity-control-device switching units 114K and 114C are identical to each other, the specific structure of the light-intensity-control-device switching unit 114K is explained below as a typical example.

Figure 6A:
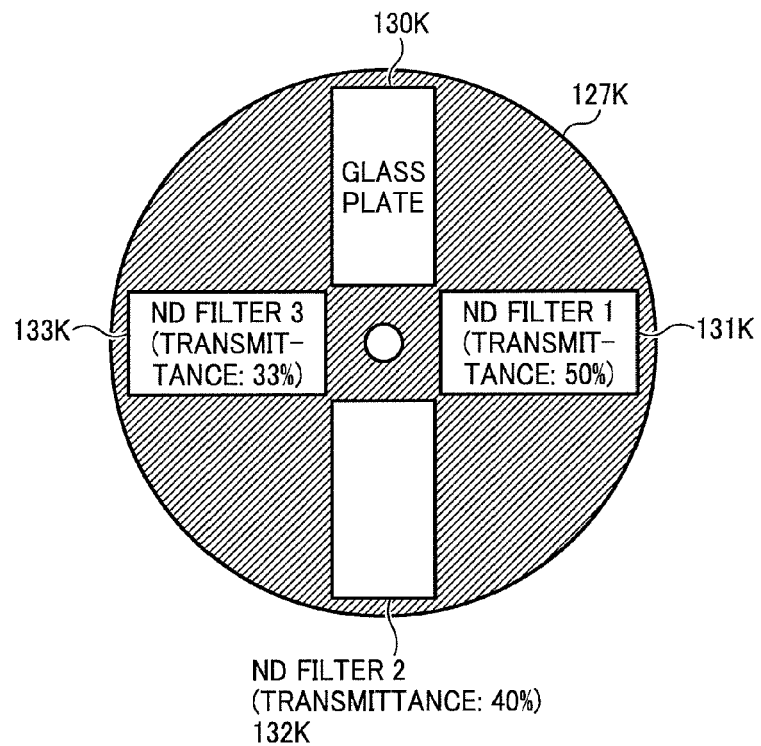
FIGS. 6A and 6B are plan views of structural examples of light-intensity control devices in a light-intensity-control-device switching unit provided in the optical scanning device and a holding member that holds the light-intensity control devices.
Figure 6B:
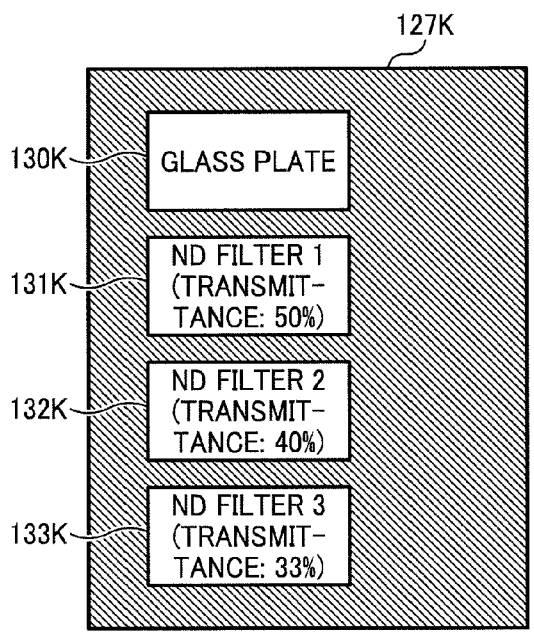

As shown in FIG. 5 and FIGS. 6A and 6B, the light-intensity-control-device switching unit 114K includes a holding member 127K and a drive unit 128K. Specifically, the holding member 127K holds a glass plate 130K and neutral density (ND) filters 131K, 132K, and 133K being a plurality of light-intensity control devices of which transmittances of light beams are 100%, 50%, 40%, and 33% respectively. The drive unit 128K drives the holding member 127K to cause only one of the glass plate 130K and the ND filters 131K, 132K, and 133K to enter the optical path of the light beam. It is noted that FIG. 5 shows the components for black in the structure shown in FIG. 3, but does not show the optical-path bending mirror 119K, the dustproof glass 120K, and the soundproof glass 121.

The glass plate 130K has an incident plane and an exit plane of a light beam both of which are formed with glass materials that are flat and mutually parallel to each other. The glass material of which material and form are the same as these of the glass plate 130K is used for the ND filters 131K, 132K, and 133K. By applying a reflection-enhancing coating to the incident plane of the light beam, the light reflectances are controlled in the above manner. The reflection-enhancing coating may be applied to the exit plane of the light beam instead of the incident plane or may be applied to both the incident plane and the exit plane. If the reflection-enhancing coating is formed with a metal coating, then it has advantages in uniformity and high-accuracy of the light transmittances and in facilitation of manufacture. In this manner, the glass plate 130K and the ND filters 131K, 132K, and 133K have mutually different light transmittances.

The holding member 127K is formed in a disk shape in an example shown in FIG. 6A, and holds the glass plate 130K and the ND filters 131K, 132K, and 133K radially arranged from the center of the holding member 127K at equal intervals. The holding member 127K as an example shown in FIG.

6B is rectangular, and holds the glass plate 130K and the ND filters 131K, 132K, and 133K at equal intervals in a line. As explained above, the holding member 127K is a support plate that supports a group of light-intensity control devices including the glass plate 130K and the ND filters 131K, 132K, and 133K. The holding member 127K is colored black so that a transmittance of the light beam becomes 0%, except for a portion thereof that holds the glass plate 130K and the ND filters 131K, 132K, and 133K. The holding member 127K is actually formed with a sheet of glass material integrally provided with the glass plate 130K and the ND filters 131K, 132K, and 133K. Specifically, the glass material is subjected to surface treatment to form the glass plate 130K and the ND filters 131K, 132K, and 133K.

The drive unit 128K includes a stepping motor (not shown) driven by the control unit 40. The drive unit 128K drives the holding member 127K to cause any one of the glass plate 130K when the rotational speed of the photosensitive drum 20K is V1, the ND filter 131K when it is V2, the ND filter 132K when it is V3, and the ND filter 133K when it is V4, to be placed in an optical path of the light beam formed by the pre-deflecting unit optical system, or placed specifically in a fixed position between the aperture 113K and the cylindrical lens 115K.

When the holding member 127K is formed as shown in FIG. 6A, the center of rotation of the holding member 127K is supported by an output shaft of the stepping motor, and the drive unit 128K drives the holding member 127K to rotate by energizing the stepping motor. The drive unit 128K controls phases of the holding member 127K with the number of energization pulses to the stepping motor, and, as shown in Table 1, places a corresponding light-intensity control device among the glass plate 130K and the ND filters 131K, 132K, and 133K in the fixed position between the aperture 113K and the cylindrical lens 115K according to the rotational speed of the photosensitive drum 20K. At this time, as shown in Table 1, control such as facet skipping is not performed. That is, the facet skipping is such that any one of six deflecting reflective facets forming the rotating polygon mirror 117a is skipped to intermittently scan the light beam, and a reflection cycle of the light beam is thereby changed.

When the holding member 127K is formed as shown in FIG. 6B, the holding member 127K is supported by a rack-pinion mechanism coupled to an output shaft of the stepping motor, and the drive unit 128K drives to move the holding member 127K, by energizing the stepping motor, in parallel to an arrangement direction of or to a direction of traversing the glass plate 130K and the ND filters 131K, 132K, and 133K. The drive unit 128K controls positions of the holding member 127K with the number of energization pulses to the stepping motor, and, as shown in Table 1, places a corresponding light-intensity control device among the glass plate 130K and the ND filters 131K, 132K, and 133K in a fixed position between the aperture 113K and the cylindrical lens 115K according to the rotational speed of the photosensitive drum 20K. At this time also, the facet skipping is not performed.

TABLE 1

| Rotational speed [Vi] of photosensitive drum | Light-intensity control device | Facet skipping |
|---|---|---|
| V1 = 100 | Glass plate | No |
| V2 = 50 | ND Filter 1 | No |

TABLE 1-continued

| Rotational speed [Vi] of photosensitive drum | Light-intensity control device | Facet skipping |
|---|---|---|
| | (Transmittance: 50%) | |
| V3 = 40 | ND Filter 2 | No |
| | (Transmittance: 40%) | |
| V4 = 33 | ND Filter 3 | No |
| | (Transmittance: 33%) | |

The exposure amount of the photosensitive drum 20K is controlled corresponding to the rotational speed thereof in the above manner, so that the exposure amount of the photosensitive drum 20K is always kept at an almost constant value regardless of the rotational speed thereof.

Figure 7:
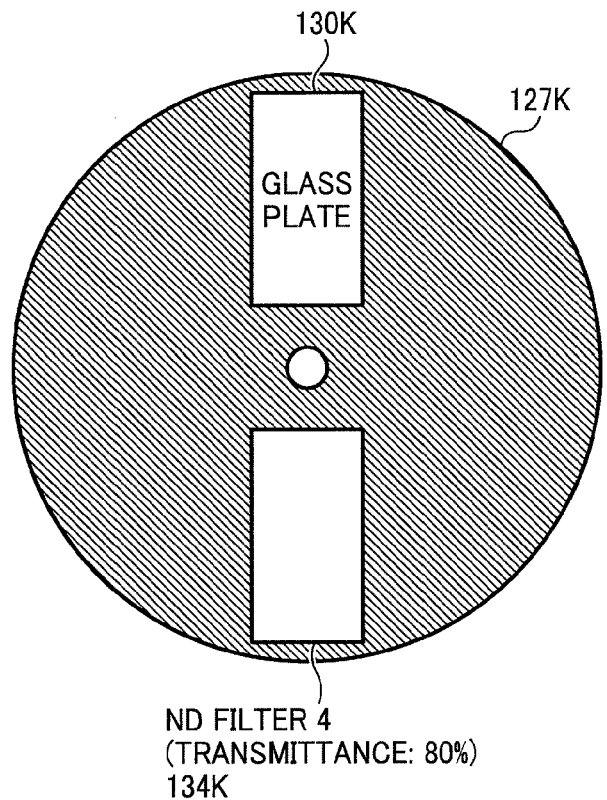
FIG. 7 is a plan view of another structural example of light-intensity control devices in the light-intensity-control-device switching unit provided in the optical scanning device and the holding member that holds the light-intensity control devices.

FIG. 7 represents another structural example of the holding member 127K. The holding member 127K is formed in a disk shape similarly to the holding member 127K shown in FIG. 6A. However, the holding member 127K shown in FIG. 7 holds only two light-intensity control devices of which light transmittances are different from each other, such as the glass plate 130K and an ND filter 134K of which light transmittances are 100% and 80%, respectively. The rest of the structure and a control method of the light transmittances are the same as these of the light-intensity-control-device switching unit 114K explained with reference to FIG. 6A.

However, as shown in Table 2, to control the exposure amount of the photosensitive drum 20K, in the optical scanning device 8, the light-intensity-control-device switching unit 114K including the holding member 127K shown in FIG. 7 places either one of the glass plate 130K and the ND filter 134K in the fixed position, and also performs facet skipping on the six deflecting reflective facets that form the rotating polygon mirror 117a to intermittently scan the light beam, so that the reflection cycle of the light beam is changed. By controlling these processes, similarly to the case shown in FIG. 6A, the exposure amount of the photosensitive drum 20K is controlled corresponding to the rotational speed thereof, and also, the exposure amount of the photosensitive drum 20K is always kept at the almost constant value regardless of the rotational speed thereof. Thus, a combination of the placement and the facet skipping has the advantage that only a small number of types of the light-intensity control devices are needed.

TABLE 2

| Rotational speed [Vi] of photosensitive drum | Light-intensity control device | Facet skipping |
|---|---|---|
| V1 = 100 | Glass plate | No |
| V2 = 50 | Glass plate | One scanning every two facets |
| V3 = 40 | ND Filter 4 (Transmittance: 80%) | One scanning every two facets |
| V4 = 33 | Glass plate | One scanning every three facets |

It is noted that a way to hold the glass plate 130K and the ND filters 131K, 132K, 133K, and 134K by the holding member 127K, a way to structure the drive unit 128K in association with the way to hold them, a way to drive the drive unit 128K, and a way to perform facet skipping are not limited to these explained with reference to FIGS. 6A and 6B, FIG. 7, Table 1, and Table 2. In addition, if a space between the optical path of the light beam for black and the optical path of the light beam for cyan is narrow, then the light beam for cyan together with the light beam for black may be passed through the glass plate 130K and the ND filters 131K, 132K, 133K, and 134K, and, in this case, the light-intensity-control-device switching unit 114K has a common structure to that of the light-intensity-control-device switching unit 114C. Thus, a single light-intensity-control-device switching unit may be used to control the intensities of a plurality of light beams that scan different surfaces to be scanned.

As explained above, the usage of the light-intensity-control-device switching unit 114K allows the exposure amount of the photosensitive drum 20K to be kept at the constant value regardless of the rotational speed thereof. However, when only any one of the glass plate 130K and the ND filters 131K, 132K, 133K, and 134K is selected and placed in the optical path, the reflected light produced by the light-intensity control device placed in the optical path causes disturbance, and this may affect image formation.

For example, when a reflected light, of the light beams having passed through the aperture 113K, reflected by any one of the glass plate 130K and the ND filters 131K, 132K, 133K, and 134K is detected by the light-intensity detecting unit 122K, an output power of the semiconductor laser 111K changes to cause a decrease in control accuracy of the light emission intensity of the semiconductor laser 111K and unevenness of an image or the like, which affects the image quality, and this is a problem. Of the light beams having passed through any one of the glass plate 130K and the ND filters 131K, 132K, 133K, and 134K, if a light beam reflected by the cylindrical lens 115K and then reflected by any one of the glass plate 130K and the ND filters 131K, 132K, 133K, and 134K enters the photosensitive drum 20K, then a so-called ghost image is formed, and this affects the image quality, which is a problem.

Figure 8:
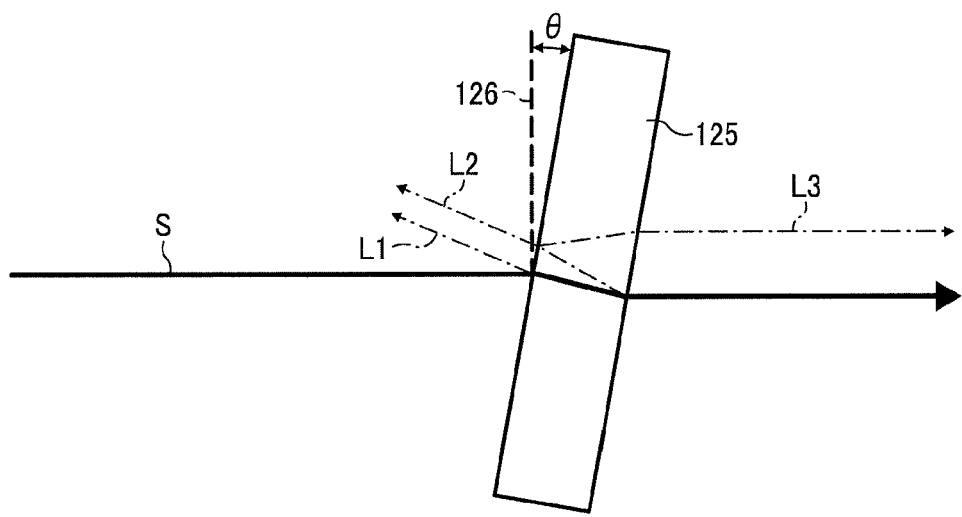
FIG. 8 is a conceptual diagram for explaining how reflected lights are generated by the light-intensity control device.

Therefore, as shown in FIG. 8, in the light-intensity-control-device switching unit 114K, a light-intensity control device 125 corresponding to the glass plate 130K and the ND filters 131K, 132K, 133K, and 134K placed in the fixed position is placed at an angle θ (≠0) with respect to a virtual plane 126 that is perpendicular to a light beam of light beams passing through the fixed position, along the optical axis of the coupling lens 112K (hereinafter, an axis line coincident with the light beam is called "optical axis S"), and reflected lights L1 to L3 due to the light-intensity control device 125 are thereby guided to the outside of areas which become disturbance. As for the optical axis S, the light beam "along the optical axis of the coupling lens 112K" mentioned here indicates that the light beam coincides with the optical axis of the coupling lens 112K. However, when the light beam having passed through the coupling lens 112K is refracted or reflected, the direction of the optical axis S is also assumed to be changed along the refraction direction or the reflection direction.

The reflected light L1 shows a return light that is a reflected light reflected on the incident plane of the light-intensity control device 125 and is returned to the side of the light source. The reflected light L2 shows a return light, of reflected lights reflected through the exit plane of the light-intensity control device 125, which passes through the incident plane and is returned to the side of the light source. The reflected light L3 shows a light, of the reflected lights reflected through the exit plane of the light-intensity control device 125, which is further reflected by the incident plane, passes through the exit plane, and travels toward the side of the image carrier. In addition to the reflected lights L1 to L3, other scattered lights possibly occur, however, FIG. 8 shows only the typical reflected lights L1 to L3 as disturbance that may affect images.

As for the reflected light L1, the lower the light transmittance, the higher the intensity of the reflected light L1, because each light transmittance in the glass plate 130K and the ND filters 131K, 132K, 133K, and 134K which form the light-intensity control device 125 is controlled by the reflection-enhancing coating applied to the incident plane. However, the light transmittance in the example shown in FIG. 7 is higher than that of the example shown in FIG. 6A. Thus, this case has advantages that the reflected light L1 hardly occurs and the disturbance also hardly occurs upon light-beam control in the light-intensity control unit 124.

Figure 9:
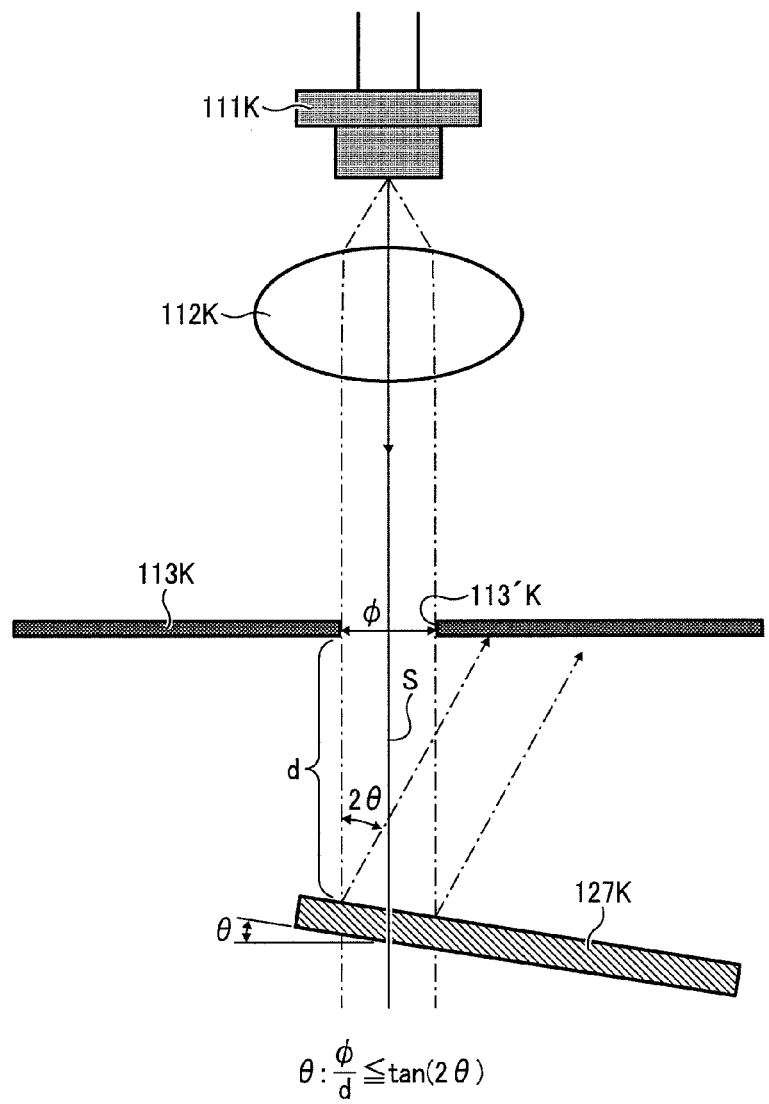
FIG. 9 is a diagram for explaining a condition of placing the light-intensity control device based on the light-intensity-control-device switching unit shown in FIG. 7.

In the light-intensity-control-device switching unit 114K, as shown in FIG. 9, the angle θ further satisfies the following expression (1):

$$\frac{\phi}{d} \leq \tan(2\theta) \qquad (1)$$

where φ is a diameter of an opening 113'K of the aperture 113K, and d is a shortest distance from an edge of the opening 113'K to the light-intensity control device 125 indicated by the holding member 127K in FIG. 9.

The opening 113'K is used to restrict the size of the light beam for black. The diameter φ indicates the size of the diameter in a direction parallel to the virtual plane 126, which is in a plane parallel to the plane of paper in FIG. 9 or in a plane in the fixed position through which the optical axis S passes, and in a plane in which the light-intensity control device 125 is inclined at an angle θ with respect to the virtual plane 126. The shortest distance d is a shortest distance along the optical path of the light beam having passed through the opening 113'K on the plane, from the edge of the opening 113'K to the light-intensity control device 125 that occupies the fixed position.

As shown in FIG. 9, the reflected light, indicated by arrow of dashed one-dotted line, reflected by the light-intensity control device 125 forms an angle 2θ with respect to the optical axis on the plane. Therefore, by satisfying the expression (1), almost all of the reflected lights L1 and L2 are guided to the body of the aperture 113K, so that the reflected lights L1 and L2 are guided to the outside of the area in which they may become disturbance. Accordingly, the reflected lights L1 and L2 are prevented from becoming disturbance upon light-beam control in the light-intensity control unit 124, and the control accuracy of the light emission intensity of the semiconductor laser 111K is maintained. Thus, it is prevented or suppressed that occurrence of unevenness of an image or the like may affect the image quality. The same goes for a case in which the light beam emitted from the semiconductor laser 111K is converted to a weak-divergent or a weak-convergent light flux by the coupling lens 112K.

Figure 10:
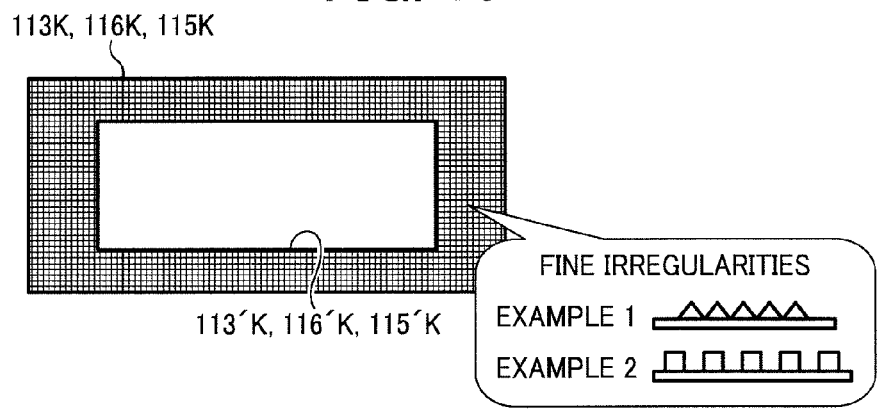
FIG. 10 is a front view of a schematic structure of first and second apertures and a cylindrical lens provided in the optical scanning device shown in FIG. 1.
Figure 11:
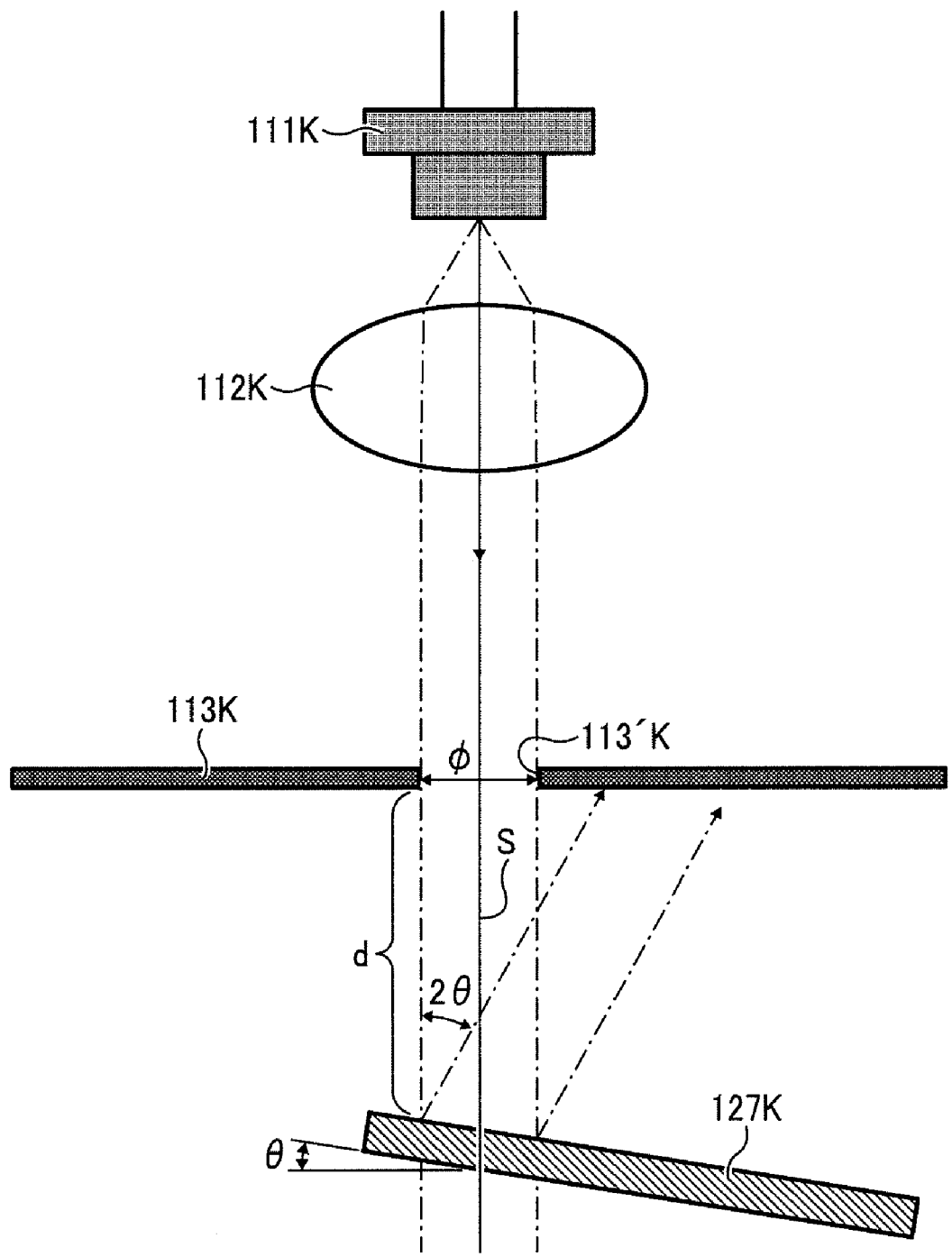
FIG. 11 is a diagram for explaining another structural example of the light source shown in FIG. 5.

The surface of the body of the aperture 113K on the side of the light-intensity control device 125 is applied with black coating so that the entire surface absorbs all the light beams. However, as shown in FIG. 10, the surface may be subjected to discontinuous fine irregularities or may be subjected to surface roughening instead of or together with the process for the irregularities, so that incident light beams are prevented from being scattered to become disturbance.

Figure 12:
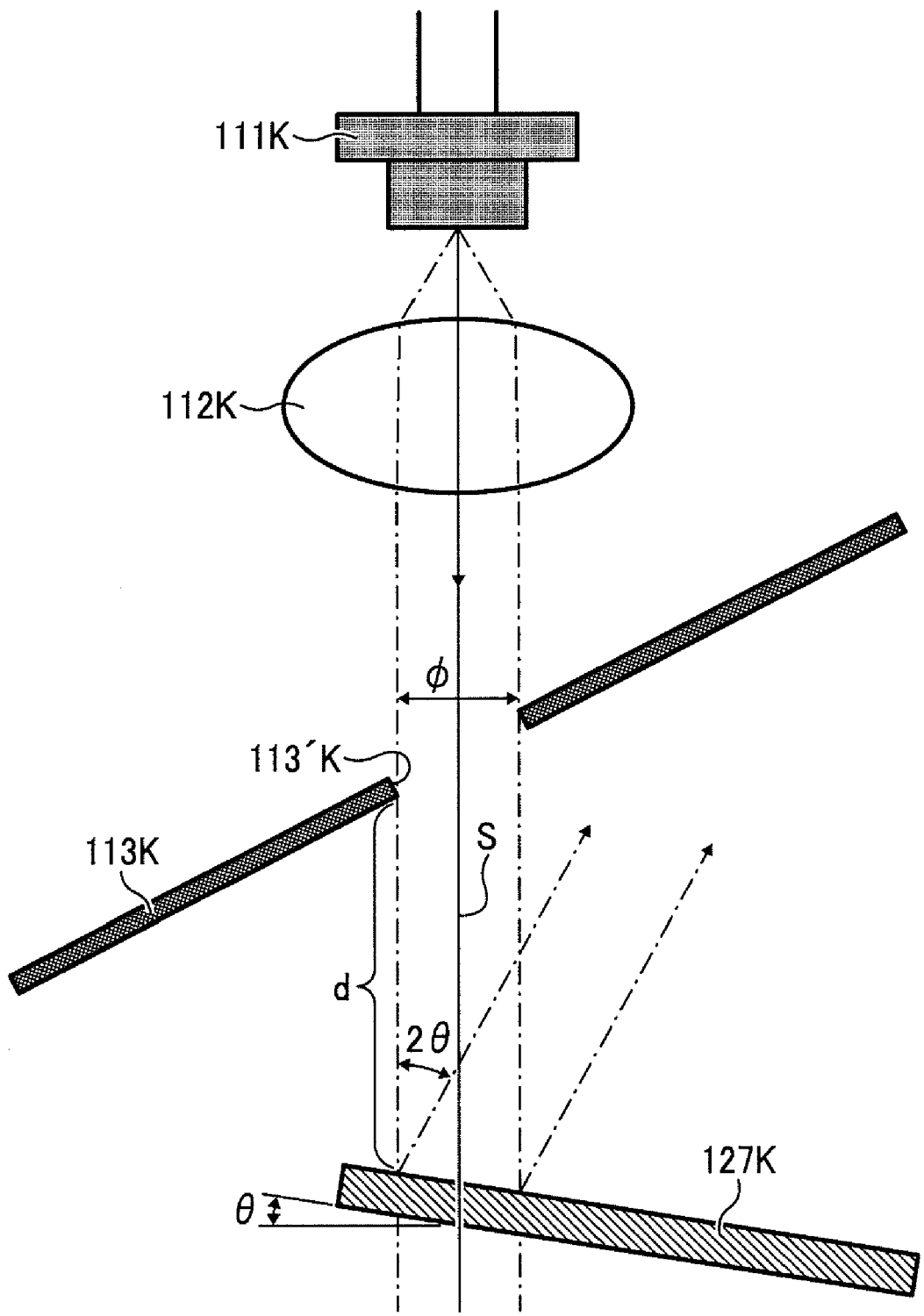
FIG. 12 is a diagram for explaining another example of how the first aperture shown in FIG. 5 is placed.

As shown in FIG. 12, the aperture 113K is desirably inclined to −θ side with respect to the virtual plane 126 shown in FIG. 8. This is because by causing the orientation of the aperture 113K to be close to a parallel to the reflected lights L1 and L2, the reflected lights L1 and L2 are difficult to be detected by the light-intensity detecting unit 122K after having passed through the opening 113'K. This structure is also applicable to various structural examples as explained below.

As explained above, by setting the angle θ to θ≠0 and also performing settings so as to satisfy the expression (1), the reflected lights L1 and L2 reflected by the light-intensity control device 125 are prevented from becoming disturbance upon light-beam control in the light-intensity control unit 124 and the control accuracy of the light emission intensity of the semiconductor laser 111K is maintained. Thus, an effect of unevenness or the like occurring in an image exerted on the image quality is prevented or suppressed, and the ghost image is also lessened, suppressed, or prevented. The ghost image appears when a reflected light corresponding to the reflected light L1 enters the photosensitive drum 20K to become disturbance as a ghost light. Specifically, the reflected light is produced in such a manner that a light beam, among the reflected light L3 and the light beams having passed through the light-intensity control device 125 occupying the fixed position, is reflected by the cylindrical lens 115K and is further reflected by the light-intensity control device 125. However, by setting the angle θ to θ≠0, the disturbance can be lessened, suppressed, or prevented, and in addition, by performing settings so as to satisfy the expression (1), the level of the lessening or the like can be improved.

However, for example, if the plane of the cylindrical lens 115K on the side of the light-intensity control device 125 is perpendicular to the optical axis S, is not subjected to a low-reflection process, and of which refractive index with respect to the incident light is 1.5, then a reflectance on the plane becomes 4%. If the reflected light reflected by the plane enters the light-intensity control device 125 of which light transmittance is 50%, then the reflected light is converged to the photosensitive drum 20K at an intensity of 2% through the optical devices in downstream of the cylindrical lens 115K, and the reflected light may thereby reach the level which becomes a problem as the ghost light.

Figure 13:
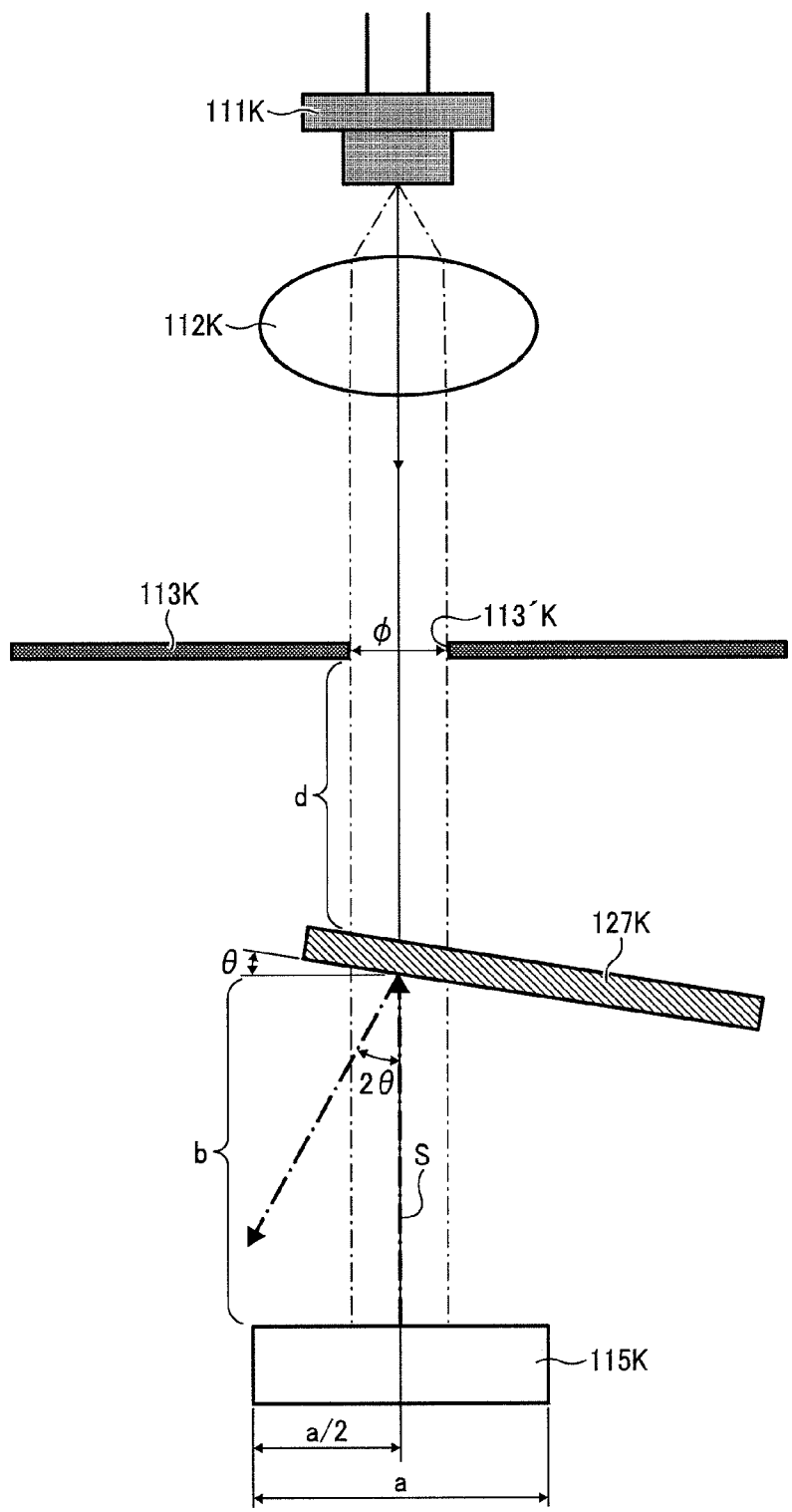
FIG. 13 is a diagram for explaining another condition of placing the light-intensity control device by the light-intensity-control-device switching unit shown in FIG. 5.

Therefore, to further highly suppress or prevent the effect of the reflected light as a factor of the ghost image exerted on the image quality, in the light-intensity-control-device switching unit 114K, the angle θ satisfies the following expression (2) together with or instead of the expression (1):

$$\frac{a}{2} \cdot \frac{1}{b} \leq \tan(2\theta) \quad (2)$$

where a is a diameter of the cylindrical lens 115K, and b is a distance from the cylindrical lens 115K to the light-intensity control device 125 represented as the holding member 127K as shown in FIG. 13.

Here, the diameter a of the cylindrical lens 115K indicates a size of the diameter in a direction parallel to the virtual plane 126, which is in a plane parallel to the plane of paper in FIG. 13 or in a plane in the fixed position through which the optical axis S passes, and in which the light-intensity control device 125 is inclined at an angle θ with respect to the virtual plane 126. The distance b is a distance along the optical axis S from the light-intensity control device 125 that occupies the fixed position to the cylindrical lens 115K.

As shown in FIG. 13, the reflected light, indicated by arrow of dashed one-dotted line, reflected by the light-intensity control device 125 is formed at an angle 2θ with respect to the optical axis S on the plane. Therefore, by satisfying the expression (2), a half or more of the reflected light is guided to an area outside the cylindrical lens 115K or to the outside of an area in which the light becomes disturbance, so that a half or more of the energy as the ghost light is removed. It is noted that the reflected light L3 is low in intensity and is the level which hardly becomes a problem originally as the ghost light. The reflected light reflected by the cylindrical lens 115K also hardly becomes a problem if the reflectance is low. Further, when the intensity of the reflected light reflected by the light-intensity control device 125 is low as shown in FIG. 7, no problem occurs even if the angle θ is set to a boundary of the expression (2) or near the boundary.

Therefore, the reflected light hardly becomes disturbance against writing of a latent image to the photosensitive drum 20K. Thus, it is possible to prevent or suppress the case in which the ghost image appears and this may affect the image quality. The same goes for a case in which the light beam emitted from the semiconductor laser 111K is converted to a weak-divergent or a weak-convergent light flux by the coupling lens 112K.

Figure 14:
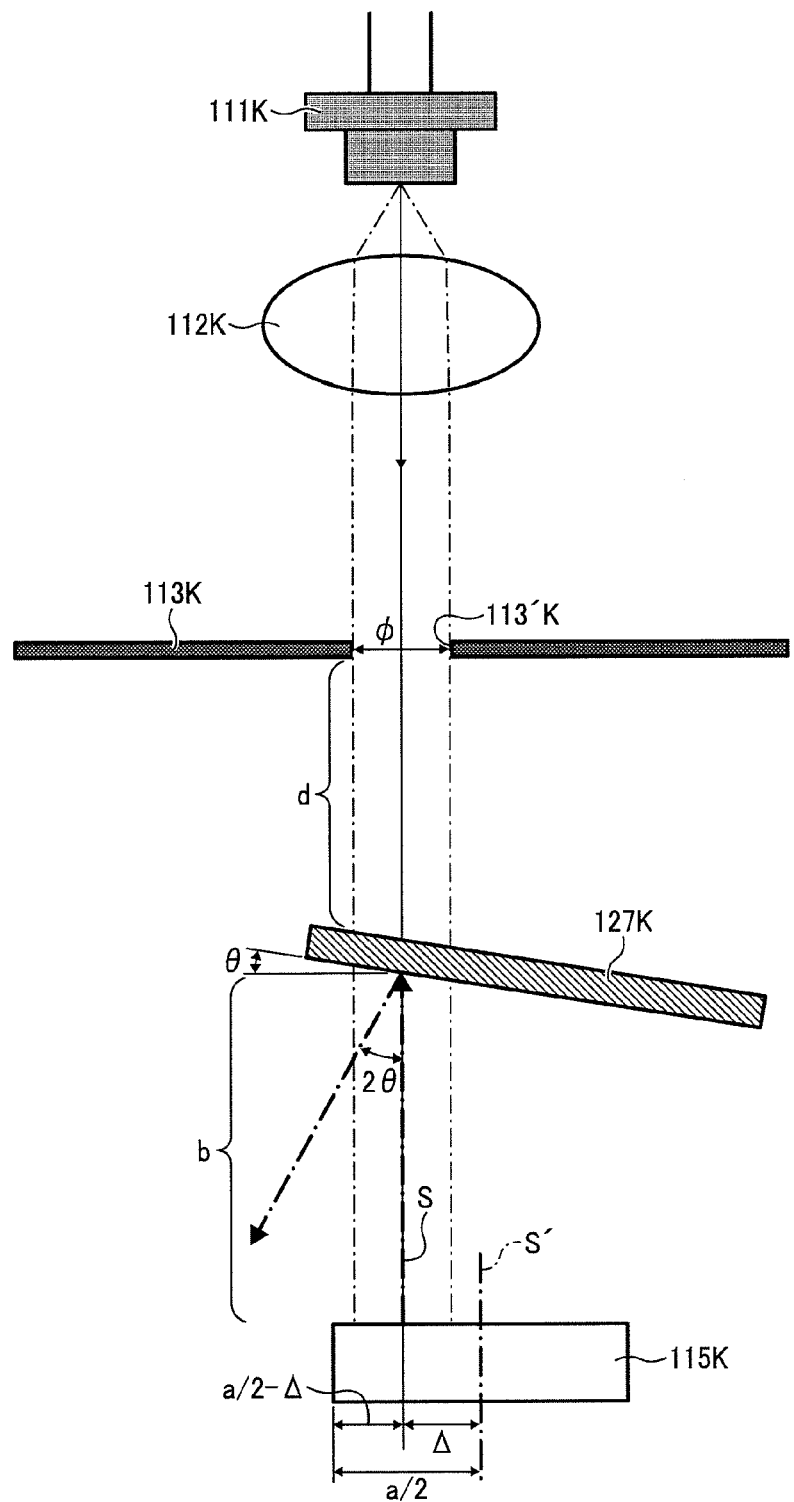
FIG. 14 is a diagram for explaining another further condition of placing the light-intensity control device by the light-intensity-control-device switching unit shown in FIG. 5.

In the structural example shown in FIG. 14, in the light-intensity-control-device switching unit 114K, the angle θ satisfies the following expression (3) together with or instead of the expression (1):

$$\left(\frac{a}{2} - \Delta\right) \cdot \frac{1}{b} \leq \tan(2\theta) \quad (3)$$

where a is the diameter of the cylindrical lens 115K, b is the distance from the cylindrical lens 115K to the light-intensity control device 125 represented as the holding member 127K as shown in FIG. 14, and Δ is a displacement of the cylindrical lens 115K.

Here, the displacement Δ indicates a shift amount of the cylindrical lens 115K in a direction parallel to the virtual plane 126, which is in a plane parallel to the plane of paper in FIG. 14 or in a plane in the fixed position through which the optical axis S passes, and in a plane in which the light-intensity control device 125 is inclined at an angle θ with respect to the virtual plane 126. The magnitude of the displacement Δ is a distance from a position to a center S' of the plane, the position being such that the optical axis S of the light beam having passed through the light-intensity control device 125 placed in the fixed position intersects a plane of the optical planes of the cylindrical lens 115K on the side of the light-intensity control device 125. Specifically, the direction of the displacement or the direction of the shift is the −θ side on the plane.

As shown in FIG. 14, the reflected light, indicated by arrow of dashed one-dotted line, reflected by the light-intensity control device 125 is formed at an angle 2θ with respect to the optical axis S on the plane. However, by placing the cylindrical lens 115K shifted in the direction, a value of the angle θ may be set to be small, which allows improved flexibility of a layout of the optical devices and the light-intensity control device 125 or the like.

In addition to setting of the angle θ to θ≠0, or in addition to combinations of the expression (1) to the expression (3), the second aperture may be placed in a position adjacent to the cylindrical lens 115K on its side opposite to the light-intensity control device 125. The second aperture blocks light beams, of the reflected light reflected by the light-intensity control device 125, having passed through the cylindrical lens 115K and traveling toward the side of the photosensitive drum 20K, so that the light beams are prevented from becoming disturbance which may cause the ghost image.

Figure 15:
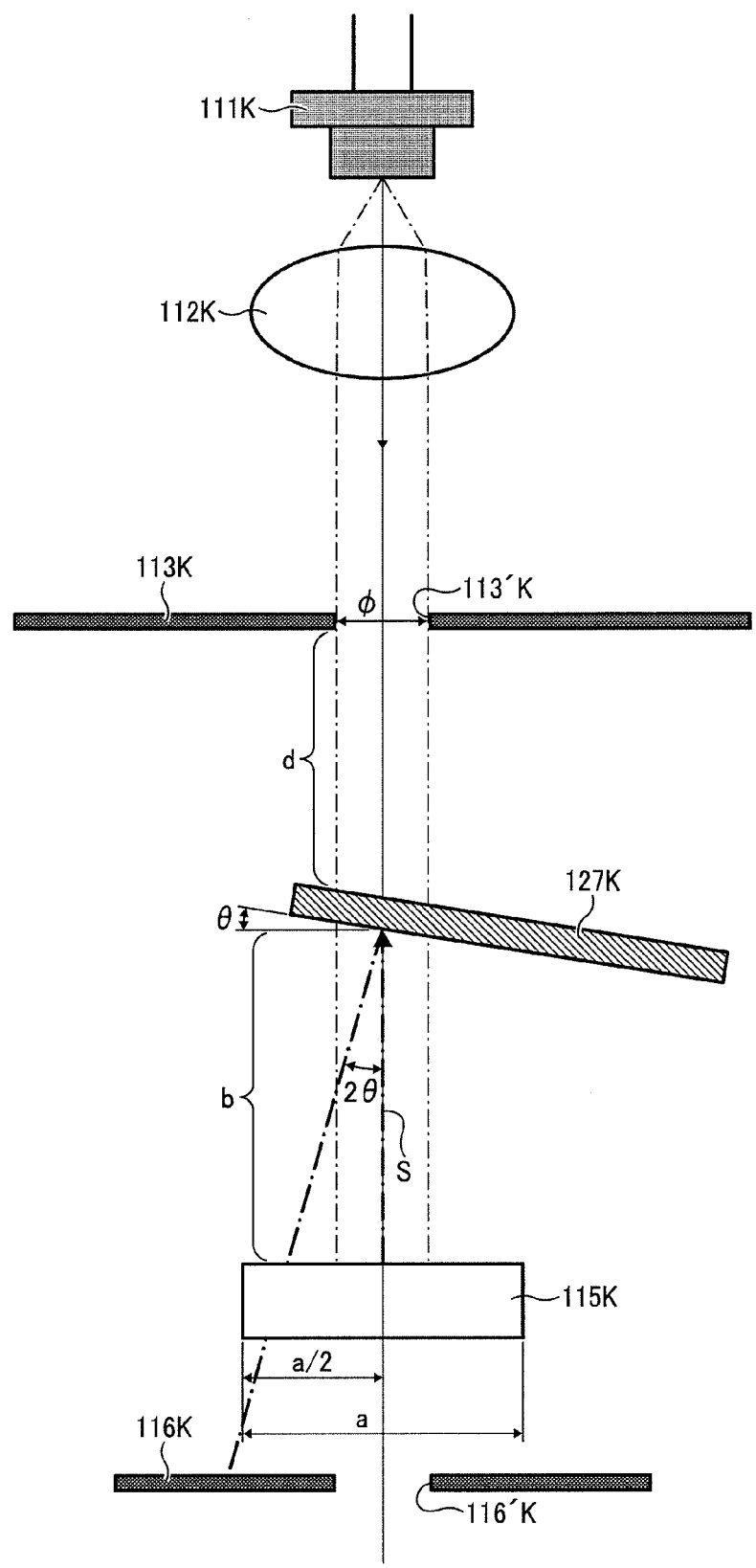
FIG. 15 is a diagram for explaining a structural example in which the second aperture is added to a structural example of the optical scanning device shown in FIG. 13.

FIG. 15 represents a structural example in which an aperture 116K as the second aperture including an opening 116'K is placed based on a combination of the angle θ (≠0), the expression (1), and the expression (2). The light-intensity control device 125 is shown as the holding member 127K also in FIG. 15. The aperture 116K is simply placed so as to block the reflected light reflected by the light-intensity control device 125 when passing through the cylindrical lens 115K. However, when the position of the aperture 116K is to be previously determined, it is clearly determined from, in addition to setting of the angle θ to θ≠0, 1: a distance from the light-intensity control device 125 to the aperture 113K, 2: a refractive index of the cylindrical lens 115K, and 3: a wall thickness of the cylindrical lens 115K.

The surface of the body of the aperture 116K on the side of the cylindrical lens 115K is applied with black coating so that the entire surface absorbs all the light beams. However, as shown in FIG. 10, the surface may be subjected to discontinuous fine irregularities or may be subjected to surface roughening instead of or together with the process for the irregularities, so that incident light beams are prevented from being scattered to become disturbance.

As for the cylindrical lens 115K, also, to prevent the reflected light from occurring in a portion outside an effective area and to prevent the ghost image from appearing due to passage of the light through the portion outside the effective area, as shown in FIG. 10, the portion outside an effective area 115'K may be subjected to discontinuous fine irregularities or may be subjected to surface roughening instead of or together with the process for the irregularities. Instead of or together with the process for the irregularities, either one of the incident plane and the exit plane of the cylindrical lens 115K may be subjected to reflection-preventing coating for the same purpose as above.

The term "effective area" mentioned here indicates a portion also called an "effective diameter" which is a range through which a normal light beam used to form a latent image or perform optical writing is supposed to pass. Therefore, an optical plane inside the effective diameter is highly precisely formed, however, a cylindrical plane continues to the outside the effective diameter, and a convergent effect is given to the light flux although the precision of the plane is inferior to that of the effective diameter. Therefore, for example, when a tilt θ of the light-intensity control device 125 is not appropriately set, light fluxes having passed through the outsides of the respective effective diameters of the incident plane and the exit plane of the cylindrical lens 115K may possibly be converged to the photosensitive drum 20K to cause a ghost image to appear. However, in this case, also, by subjecting the incident plane of the cylindrical lens 115K to the process, the ghost image can be prevented or suppressed.

For the same purpose as above, and in addition to this, for the purpose of preventing disturbance upon light-beam control in the light-intensity control unit 124, if the incident planes or the reflection planes of optical devices that use permeability of the light, of a plurality of optical devices included in the optical system, are flat surfaces, then it is preferable that at least one of the planes is subjected to the reflection-preventing coating.

As explained above, the reason why the angle θ is set to θ≠0 and various structures are added to the structure in addition to these indicated by the expressions (1), (2) and (3) is because an error occurring upon positioning of the holding member 127K by the light-intensity-control-device switching unit 114K cannot perfectly be removed. However, by setting the angle θ to θ≠0 and adding various structures to the structure in addition to these indicated by the expressions (1), (2) and (3), the initial purpose to incline the light-intensity control device 125 at the angle θ can be achieved even if an error occurs upon positioning of the holding member 127K and even if an error occurs in the angle θ related to the light-intensity control device 125 placed in the fixed position.

Figure 16:
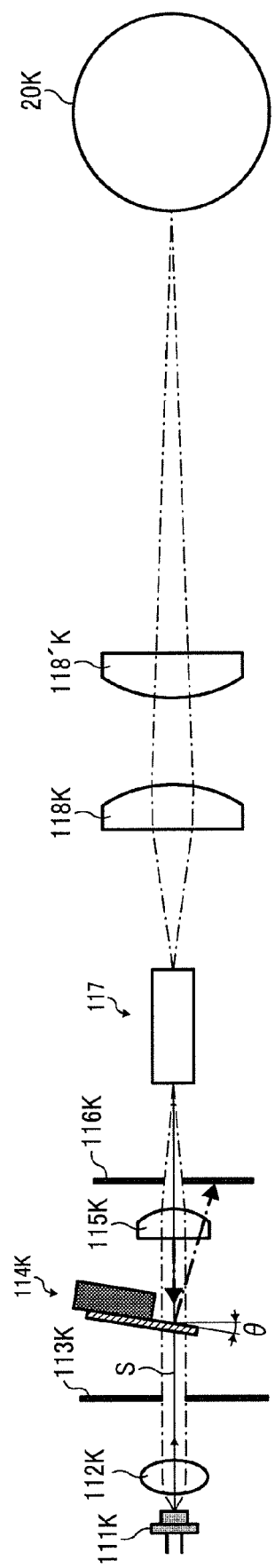
FIG. 16 is a diagram for explaining another example of a setting direction of an angle θ.

In the structural examples, the angle θ is formed by an angle inclined within a scan plane as is clear from FIG. 5, however, as shown in FIG. 16, the angle θ may be formed by an angle including the optical axis S and inclined within a plane vertical to the scan plane, or may be formed by an inclination obtained by a combination of these. In FIG. 16, a second scanning lens 118'K is placed in addition to the scanning lens 118K. This structure can be applied to other structural examples.

The light-intensity control device 125 or the glass plate 130K and the ND filters 131K, 132K, 133K, and 134K are parallel plates each of which entrance and exit planes of the light beam have no curvature and have no power on the light beam incoming into or outgoing from the corresponding plane. That is, the light-intensity control device 125 is placed, literally, only to control a transmitted light intensity. Thus, the displacement of an exposure position due to provision of the light-intensity control device can be suppressed.

However, the inclination of the angle θ causes the position of the light beam output from the light-intensity control device 125 to be displaced with respect to the light beam entering the light-intensity control device 125. Therefore, to cancel out the displacement, the position of the light source can be slightly shifted, or parallel plates with a high transmittance in which a light intensity control function is ignorable can also be set in place.

It has been explained that the glass plate 130K and the ND filters 131K, 132K, 133K, and 134K are the glass materials or the devices with the glass material subjected to the reflection-enhancing coating in the examples. However, they may be plastic materials or devices in which the plastic material is subjected to the reflection-enhancing coating, may be a light absorption device, or may be a combination thereof. Further, a coating of an original and a low-reflection coating may be used in combination thereof.

The glass plate 130K and the ND filters 131K, 132K, 133K, and 134K are used to control an exposure amount according to image forming speed. In addition, these components may be used to equalize intensities of scanning lights that scan the photosensitive drums 20Y, 20M, 20C, and 20K. In this manner, even if light-use efficiencies are different from one another in the optical systems corresponding to the respective colors caused by a slight difference occurring in optical characteristics of the optical devices and caused by a difficulty in perfect removal of a fitting error in their manufacturing processes or the like, variations of the light-use efficiencies can be minimized, and toner images of the respective colors are thereby excellently formed with density that allows a satisfactory composite color image. It is also effective in reduction in worsening of the droop characteristics.

Figure 17:
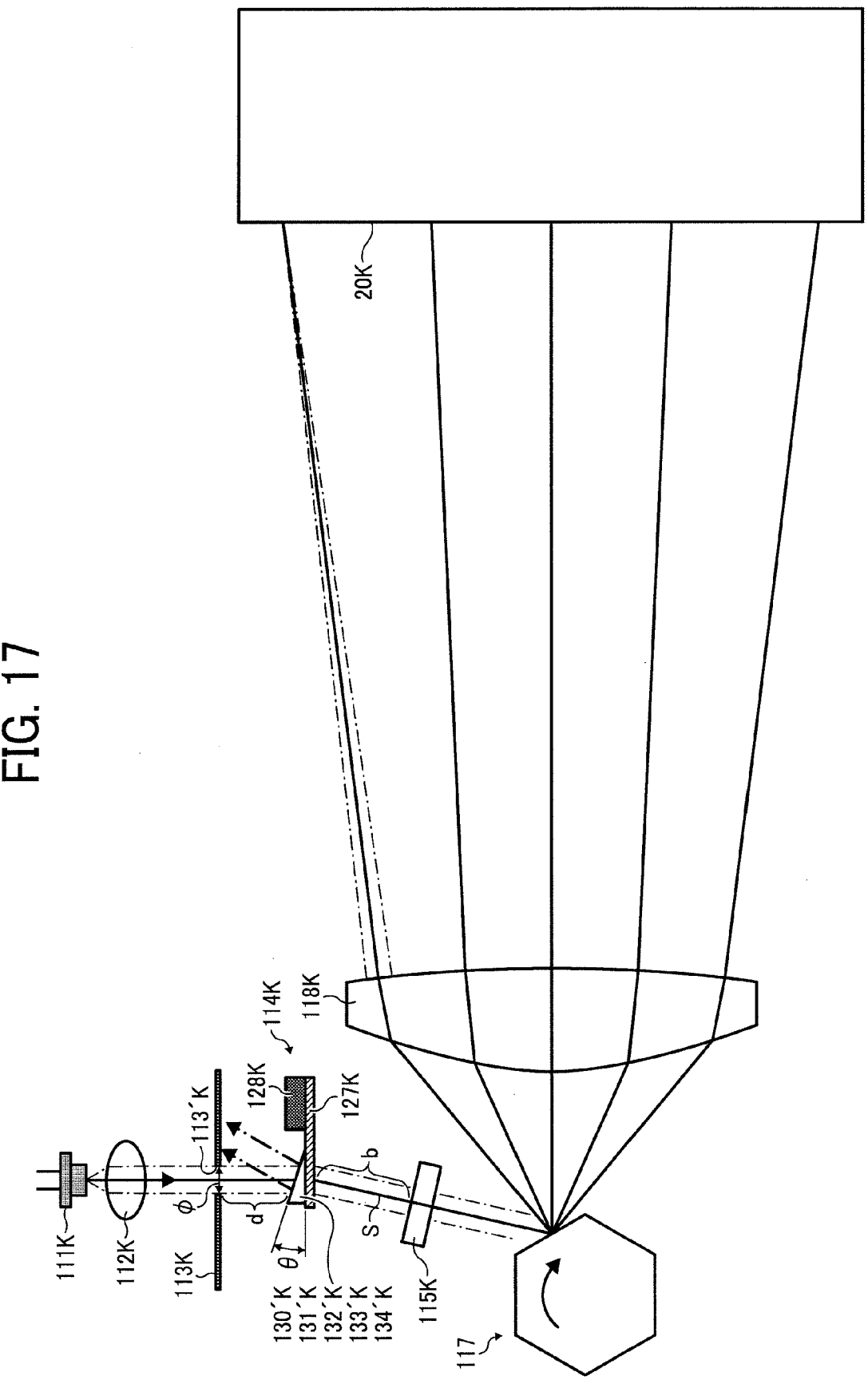
FIG. 17 is a plan view of another structural example of the light-intensity control devices.

In the structural examples, the light-intensity control device is formed with a member of which incident plane and the exit plane of the light beam are parallel to each other, as shown in the glass plate 130K and the ND filters 131K, 132K, 133K, and 134K. However, as shown in FIG. 17, the light-intensity control device may be a prism member in which the incident plane and the exit plane of the light beam form the angle θ. These light-intensity control devices corresponding to the glass plate 130K and the ND filters 131K, 132K, 133K, and 134K are assigned with a sign ' added to the same reference numerals in FIG. 17. Thus, these members are hereinafter described as "prisms 130K', 131K', 132K', 133K', and 134K', respectively.

In the structural example shown in FIG. 17, each of the incident planes of the light beams in the prisms 130K', 131K', 132K', 133K', and 134K' forms an angle θ with respect to the optical axis S. The holding member 127K is provided perpendicular to the optical axis S on the incident plane sides of the prisms 130K', 131K', 132K', 133K', and 134K', and supports the exit plane sides of the prisms 130K', 131K', 132K', 133K', and 134K' by different positions.

The holding member 127K may support the incident plane sides of the prisms 130K', 131K', 132K', 133K', and 134K', however, in this case, the holding member 127K is placed so as to form an angle θ with respect to the optical axis S on the exit plane sides of the prisms 130K', 131K', 132K', 133K', and 134K'.

In the both cases, the optical axis S on the exit plane sides of the prisms 130K', 131K', 132K', 133K', and 134K' forms an angle θ with respect to the optical axis S on the incident plane sides of the prisms 130K', 131K', 132K', 133K', and 134K'. Therefore, the members such as the cylindrical lens 115K and the aperture 116K through which the light beams having passed through the prisms 130K', 131K', 132K', 133K', and 134K' pass are arranged along the optical path of the light beams. In this case, if the members such as the cylindrical lens 115K and the aperture 116K are appropriately arranged so as to satisfy the conditions in the structural examples, then individual advantages can be obtained.

Each of the prisms 130K', 131K', 132K', 133K', and 134K' is a wedge prism, and color blurring is highly suppressed. Metal coating used for the reflection-enhancing coating is applied to planes, of the incident planes and the exit planes of the prisms 130K', 131K', 132K', 133K', and 134K', on the side of forming an angle θ with respect to the optical axis S of the light beams entering the prisms 130K', 131K', 132K', 133K', and 134K', so that the function of the coating is excellently delivered.

In the image forming apparatus 100, when the shading properties are to be corrected and the process control is to be performed, the exposure amounts to the photosensitive drums 20Y, 20M, 20C, and 20K performed by the light source such as the semiconductor lasers 111K and 111C are respectively controlled. At this time, even if there are the disadvantages in output characteristics of the light source, by selectively using the light-intensity control device such as the glass plate 130K and the ND filters 131K, 132K, 133K, and 134K, the performance of the light source is excellent, and the exposure is satisfactorily performed. This is because by using the light-intensity control device with a low light transmittance, the shading properties are flattened, which enables the light source to operate in a range in which the output power of the light source becomes excellent.

The exemplary embodiment of the present invention is explained so far, however, the present invention is not limited to the particular embodiment. Therefore, various modifications and changes can be made within a scope of the present invention as described in appended claims unless otherwise specified.

For example, in the first embodiment, one light-intensity control device is placed in each optical path, however, two or more light-intensity control devices may be arranged in each optical path to optimize the image forming speed. In this case, the light transmittances of the light-intensity control devices may be different from each other.

Further, in the first embodiment, the light-intensity control device is placed particularly between the first aperture and the cylindrical lens from the light source to the scanning unit. However, if possible, the position of the light-intensity control device is not limited thereto, and thus, it may be placed in any other position in the optical path from the light source to the scanning unit, or it may be placed in any position in the optical path from the scanning unit to the surface to be scanned. However, if it is placed in the optical path from the scanning unit to the surface to be scanned, the light-intensity control device has to be placed for the light beam after scanning, which causes the light-intensity control device and the light-intensity-control-device switching unit to be upsized. Thus, it is desirable that it is placed in the optical path from the light source to the scanning unit.

In the first embodiment, one optical scanning device is provided for all the image carriers, and only one optical scanning device is provided in the image forming apparatus. However, a plurality of optical scanning devices may be provided in the image forming apparatus in such a manner that one or more optical scanning devices are provided for one image carrier or for a plurality of image carriers. In this case, also, the optical scanning devices are configured to select a light-intensity control device according to the image forming speed and to set an angle θ in the above manner.

The deflecting unit is not a rotating polygon mirror but may be a vibrating device of which reflection plane vibrates.

The image forming apparatus can be applied not only to a so-called tandem image forming apparatus, but also to a so-called one-drum image forming apparatus in which a color image is obtained by successively forming toner images of respective colors on one photosensitive drum and sequentially superimposing the toner images on one another. The image forming apparatus may also be one that can form only a mono-color image.

In the image forming apparatus of any one of the types, an intermediate transfer element is not used but toner images of respective colors may be directly transferred to a sheet such as the transfer sheet S. In this case, the toner images on a plurality of image carriers are directly transferred to the sheet during conveyance of the sheet by, for example, a conveyor belt.

The image forming apparatus does not have to be a multi-function product with functions of a copier, a printer, and a facsimile, but may be single units of these, or may be any other multifunction product with other combinations such as a multifunction product with a combination of a copier and a printer.

The effects described in the embodiment of the present invention are only examples of most preferable effects obtained from the present invention, and thus, the effects according to the present invention are not limited to these described in the embodiment of the present invention.

An optical scanning device according to a second embodiment of the present invention is explained below. An image forming apparatus that includes the optical scanning device is the same as that shown in FIG. 1, and a schematic structure of the optical scanning device is the same as that shown in FIG. 2. Therefore, explanation thereof is omitted.

Figure 18:
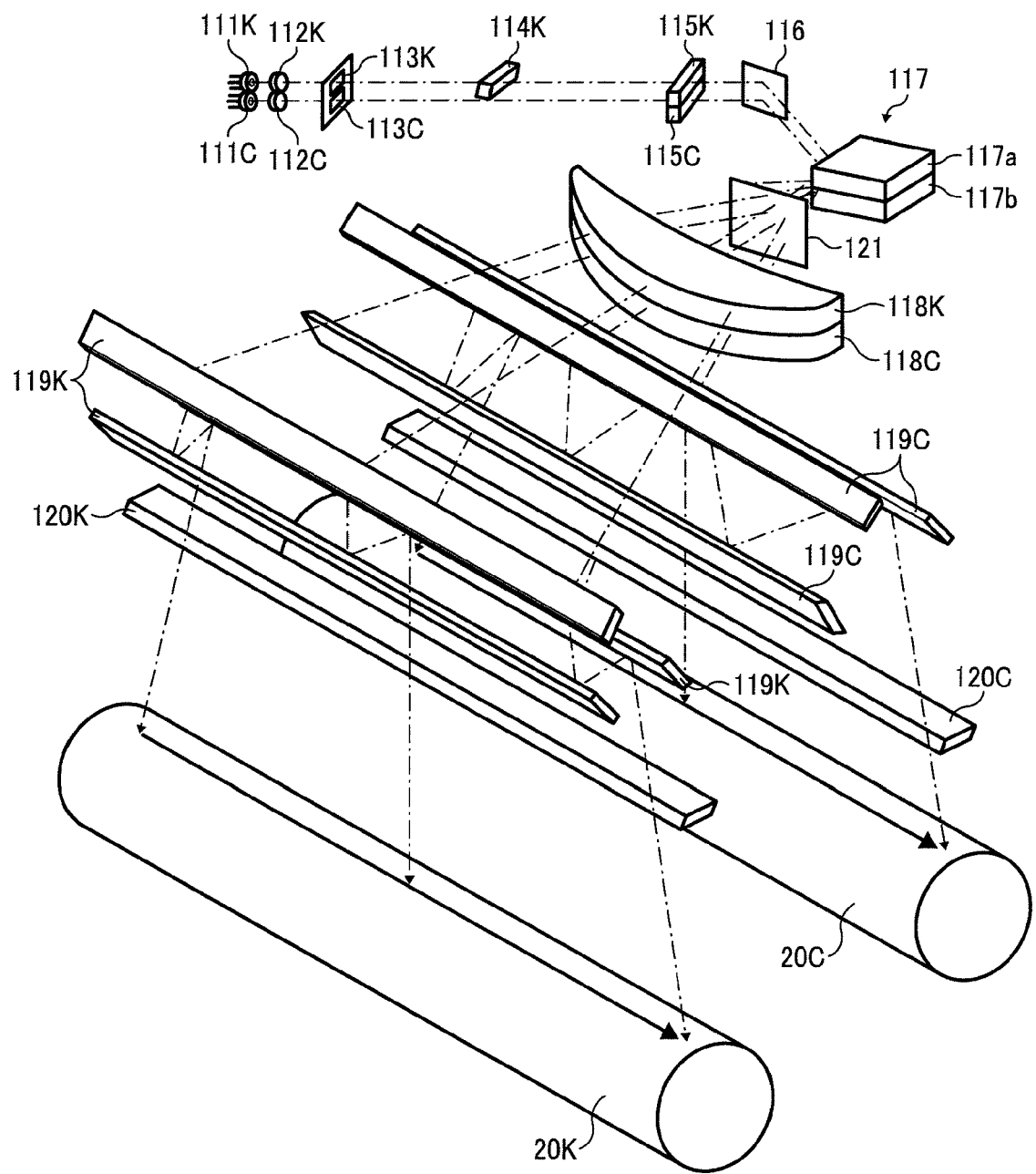
FIG. 18 is a diagram for explaining a structural example (1) of an optical scanning device according to a second embodiment of the present invention.
Figure 19:
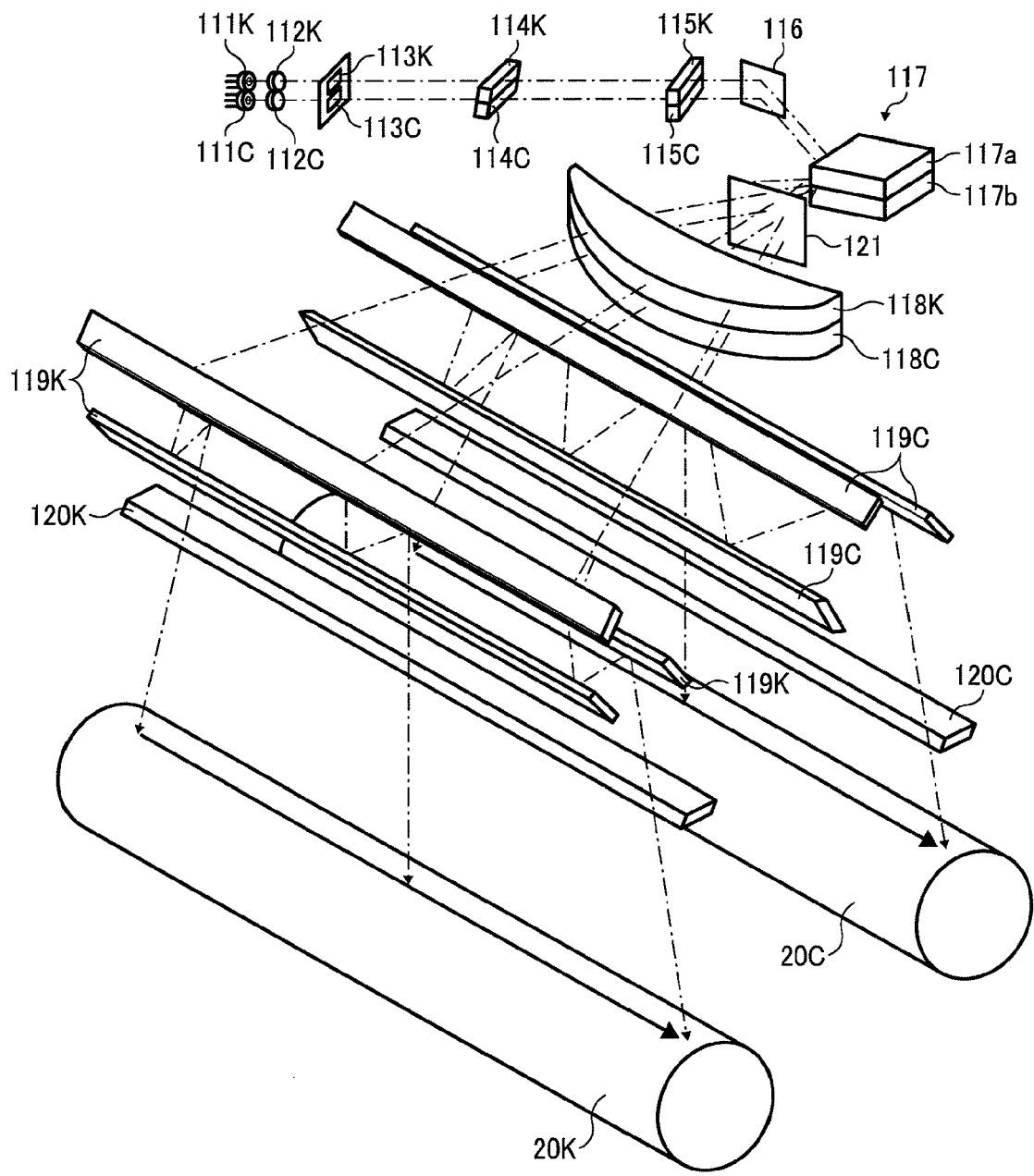
FIG. 19 is a diagram for explaining a structural example (2) of the optical scanning device according to the second embodiment.
Figure 20:
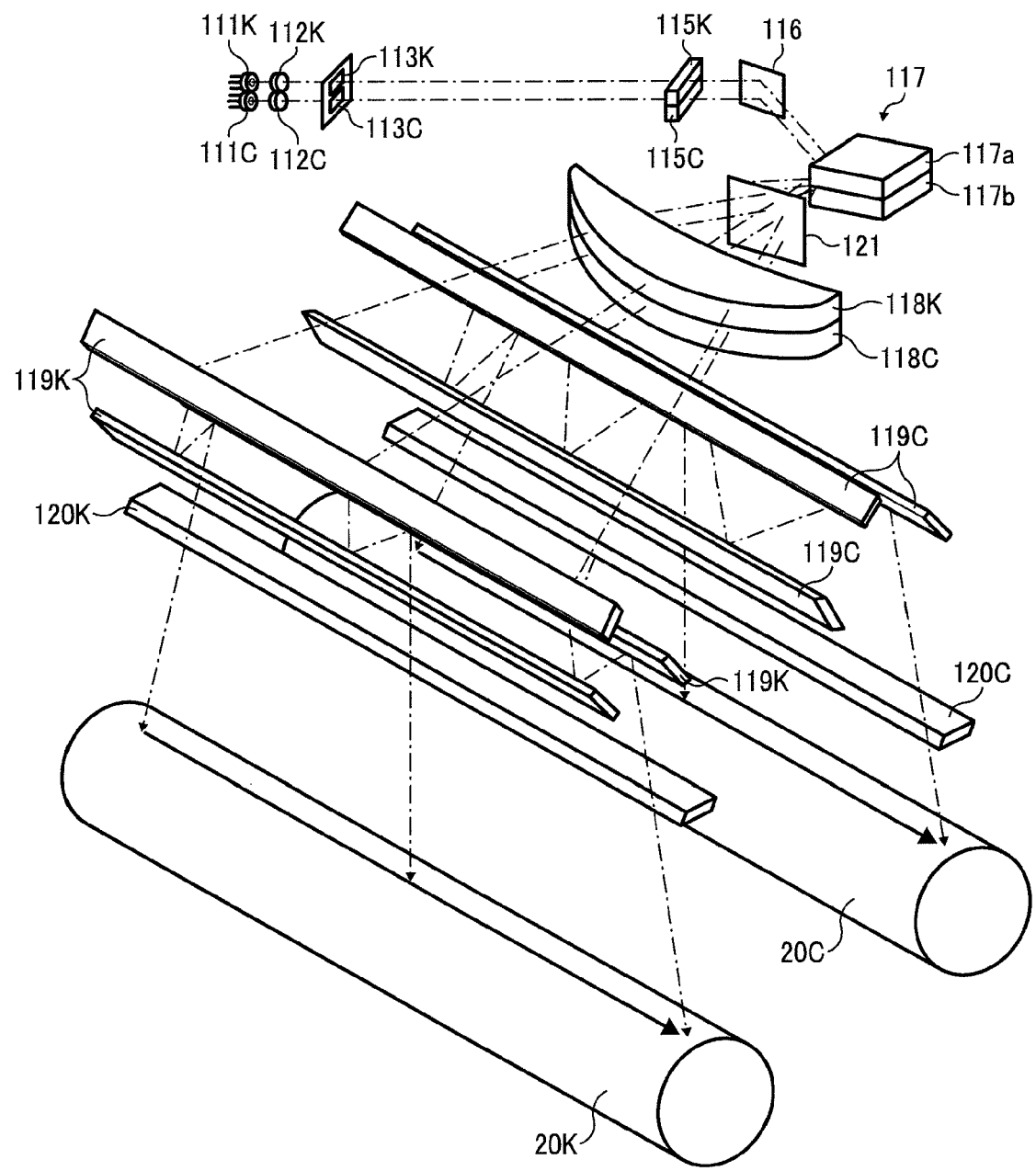
FIG. 20 is a diagram for explaining a structural example (3) of the optical scanning device according to the second embodiment.

FIGS. 18, 19, and 20 are diagrams for explaining structural examples of the optical scanning device according to the second embodiment. These figures are different from each other in the structure of the light-intensity-control-device switching unit 114K. In addition, because block configurations in these optical scanning devices are the same as that shown in FIG. 4, explanation thereof is omitted.

FIG. 18 represents a structure, of a whole structure of the optical scanning device 8, on the left side from the optical deflecting unit 117 in the horizontal direction in FIGS. 1 and 2. As explained above, because the optical scanning device 8 is symmetrically structured with respect to the optical deflecting unit 117 in the horizontal direction in FIGS. 1 and 2, the structure of the optical scanning device 8 is explained with reference to FIG. 18, and explanation of a structure on the right side from the optical deflecting unit 117 in the horizontal direction in FIGS. 1 and 2 is omitted if not necessary by assigning corresponding numerals to FIG. 2.

Referring to FIG. 18, reference numerals 111K and 111C represent semiconductor lasers. The semiconductor lasers 111K and 111C respectively include single light sources, and the light sources emit single light beams to scan the photosensitive drums 20K and 20C, respectively. As shown in FIG. 4, the semiconductor lasers 111K and 111C also emit light beams, different from the light beams to scan the photosensitive drums 20K and 20C, in an opposite direction to the light beams, with the same intensity as that of the light beams or with the intensity at a predetermined ratio with respect to the intensity of the light beams. The emitted light beams are detected by the light-intensity detecting units 122K and 122C, respectively, as shown in FIG. 4. Further, the semiconductor lasers 111K and 111C can modulate or can control the intensity of emitted light beams or the light intensity, and both of them are held in holders (not shown).

As shown in FIG. 18, each of the light beams emitted from the semiconductor lasers 111K and 111C is coupled by the coupling lens 112K or 112C, and is converted to a parallel light flux which is a form of light flux suitable for an optical system in the downstream side of the coupling lens 112K or 112C. It is noted that the coupling lenses 112K and 112C may convert the light beams emitted from the semiconductor lasers 111K and 111C to a weak-divergent light flux or a weak-convergent light flux, respectively.

Each of the light beams having passed through the coupling lenses 112K and 112C and becoming a parallel light flux that is a desired form of a light flux passes through the aperture 113K or 113C that is an aperture stop for controlling the width of the light beam or controlling the size of the light beam. During passage of the light beams through the apertures 113K and 113C, the light beams are beam-shaped and each beam diameter is stabilized. Thereafter, only the light beam having passed through the aperture 113K passes through the light-intensity-control-device switching unit 114K. The light-intensity-control-device switching unit 114K will be explained later.

Each of the light beams enters the cylindrical lens 115K or 115C, is converged in the sub-scanning direction by the function of the cylindrical lens 115K or 115C, is reflected by an incident mirror 116, and is formed as a line image elongated in the main scanning direction near the deflecting reflective facet of the optical deflecting unit 117.

The coupling lens 112K, the aperture 113K, the cylindrical lens 115K, and the incident mirror 116 are structured as a set of a pre-deflecting unit optical system that guides the light beam emitted from the semiconductor laser 111K being the light source to the optical deflecting unit 117. The coupling lens 112C, the aperture 113C, the cylindrical lens 115C, and the incident mirror 116 are structured as a set of a pre-deflecting unit optical system that guides the light beam emitted from the semiconductor laser 111C being the light source to the optical deflecting unit 117.

In FIG. 18, reference numeral 121 represents the soundproof glass provided in a window of a soundproof housing (not shown) of the optical deflecting unit 117. The light beam reflected by the incident mirror 116 enters the optical deflecting unit 117, where it is deflected, and the deflected light beam is output to the side of the scanning-imaging optical system through the soundproof glass 121. The optical deflecting unit 117 includes the rotating polygon mirror 117a as an upper polygon mirror and the rotating polygon mirror 117b as a lower polygon mirror which are vertically layered in two stages in the rotating axis direction and are integrated into one unit. The rotating polygon mirrors 117a and 117b have the identical shape with four deflecting reflective facets in this example.

In FIG. 18, the reference numerals 118K and 118C represent scanning lenses; 119K and 119C, optical-path bending mirrors; and 120K, 120C, dustproof glasses, respectively. The dustproof glasses 120K and 120C are dustproof members which are arranged to prevent entering of dust into the optical scanning device 8.

The scanning lens 118K and the optical-path bending mirror 119K form a set of scanning-imaging optical system that guides the light beam deflected by the rotating polygon mirror 117a of the optical deflecting unit 117 or guides the light beam emitted from the semiconductor laser 111K to the photosensitive drum 20K being a corresponding optically scanning position to form a light spot thereon. The scanning lens 118C and the optical-path bending mirror 119C form a set of scanning-imaging optical system that guides the light beam deflected by the rotating polygon mirror 117b of the optical deflecting unit 117 or guides the light beam emitted from the semiconductor laser 111C to the photosensitive drum 20C being a corresponding optically scanning position to form a light spot thereon. The dustproof glasses 120K and 120C are parallel plates each of which entrance and exit planes of the light beam have no curvature and have no power on the light beam incoming into or outgoing from the corresponding plane, and are therefore not included in the scanning-imaging optical system.

As explained above, the light beam deflected by the rotating polygon mirror 117a of the optical deflecting unit 117 reaches the photosensitive drum 20K through the scanning-imaging optical system including the scanning lens 118K and through the dustproof glass 120K, to scan the photosensitive drum 20K. The light beam deflected by the rotating polygon mirror 117b of the optical deflecting unit 117 reaches the photosensitive drum 20C through the scanning-imaging optical system including the scanning lens 118C and through the dustproof glass 120C, to scan the photosensitive drum 20C.

The pre-deflecting unit optical system including the coupling lens 112K, the optical deflecting unit 117, and the scanning-imaging optical system including the scanning lens 118K form a set of optical system that guides the light beam emitted from the semiconductor laser 111K to the photosensitive drum 20K so as to scan the photosensitive drum 20K therewith. The pre-deflecting unit optical system including the coupling lens 112C, the optical deflecting unit 117, and the scanning-imaging optical system including the scanning lens 118C form a set of optical system that guides the light beam emitted from the semiconductor laser 111C to the photosensitive drum 20C so as to scan the photosensitive drum 20C therewith.

The light-intensity-control-device switching unit 114K is provided to control the intensity of a scanning light for scanning the photosensitive drum 20K. The light-intensity-control-device switching unit 114K is explained as follows.

In the optical scanning device 8 with all the components fitted therein except for the light-intensity-control-device switching unit 114K, a ratio of an intensity of light beam being a scanning light that reaches and scans the photosensitive drum 20K to an light intensity of light beam emitted from the semiconductor laser 111K was measured, and the measured ratio was 5%. Namely, the light-use efficiency when the light beam passes through the optical system including the coupling lens 112K was 5%. On the other hand, the light-use efficiency when the light beam passes through the optical system including the coupling lens 112C was 3%.

Because of this, there occurs a difference in the intensities of scanning lights for scanning the photosensitive drums 20K and 20C even when the intensities of light beams emitted from the semiconductor lasers 111K and 111C are the same as each other, and a difference also occurs in formed images. Therefore, a light-intensity-control-device switching unit of which light transmittance is 60% is selected as the light-intensity-control-device switching unit 114K and is placed in the optical scanning device 8, so that the intensities of scanning lights are made equal to each other. The reason that there occurs a difference in the light-use efficiencies is because even if the same materials are used for the optical system including the coupling lens 112K and for the optical system including the coupling lens 112C, there occurs a slight difference in the optical characteristics of the optical devices that form these optical systems in manufacturing process or the like, and because it is difficult to perfectly remove fitting errors.

Thus, by placing a device that decreases the light-use efficiency such as the light-intensity-control-device switching unit 114K, the variation in the light-use efficiency can be minimized. To set the light transmittance to 60%, in the light-intensity-control-device switching unit 114K shown in FIG. 18, a light-reducing coating is applied to the incident plane to reduce the light transmittance, and the light transmittance of the incident plane (hereinafter, "T1") is set to 64.81%, while a low-reflection coating is applied to the exit plane, and the light transmittance of the exit plane (hereinafter, "T2") is set to 92.58%.

The light-intensity-control-device switching unit 114K is parallel plates each of which entrance and exit planes of the light beam have no curvature and have no power on the light beam incoming into or outgoing from the corresponding plane. That is, the light-intensity-control-device switching unit 114K is placed, literally, only to control a transmitted light intensity. Thus, the displacement of an exposure position due to provision of the light-intensity control device can be suppressed.

The light-intensity control devices such as the light-intensity-control-device switching unit 114K are provided according to necessity so as to cause the light intensities of the scanning lights to coincide with each other, and are appropriately provided in the ways as shown in FIGS. 19 and 20.

The optical scanning device 8 in FIG. 19 includes the light-intensity-control-device switching units 114K and 114C. In the optical scanning device 8 with all the components fitted therein except for the light-intensity-control-device switching units 114K and 114C, the light-use efficiency of the light beam emitted from the semiconductor laser 111K was 5%, while the light-use efficiency of the light beam emitted from the semiconductor laser 111C was 4%. Therefore, by selecting one, as the light-intensity-control-device switching unit 114K, of which light transmittance is 50% (T1=52.44%, T2=95.35%) and also selecting one, as the light-intensity-control-device switching unit 114C, of which light transmittance is 62.5% (T1=68.47%, T2=91.29%), and by arranging them in the optical scanning device 8, the light-use efficiencies of the respective image stations are set to 2.5%, so that the intensities of scanning lights for scanning the photosensitive drums 20K and 20C are made equal to each other.

In the optical scanning device 8 as shown in FIG. 20, the dustproof glasses 120K and 120C are used as the light-intensity control device. In the optical scanning device 8 with all the components fitted therein except for the dustproof glasses 120K and 120C, the light-use efficiency of the light beam emitted from the semiconductor laser 111K was 5%, while the light-use efficiency of the light beam emitted from the semiconductor laser 111C was 4%. Therefore, by selecting one, as the dustproof glass 120K, of which light transmittance is 50% (T1=52.44%, T2=95.35%) and selecting one, as the dustproof glass 120C, of which light transmittance is 62.5% (T1=68.47%, T2=91.29%), and by arranging them as the light-intensity control devices in the optical scanning device 8, the light-use efficiencies of the respective image stations are set to 2.5%, so that the intensities of scanning lights for scanning the photosensitive drums 20K and 20C are made equal to each other.

The light-intensity-control-device switching unit 114K in the example in FIG. 18 and the light-intensity-control-device switching units 114K and 114C in the example in FIG. 19 are placed closer to the side of the semiconductor lasers 111K and 111C than to the optical deflecting unit 117 in the optical paths of the light beams that are emitted from the semiconductor lasers 111K and 111C and reach the photosensitive drums 20K and 20C. If the light-intensity control devices are placed closer to the side of the photosensitive drums 20K and 20C than to the optical deflecting unit 117 in the optical paths, the light-intensity control devices have to be placed in an area through which the light beams scanned by the optical deflecting unit 117 pass. Therefore, the light-intensity control devices need to be elongated in the main scanning direction. Because cost of optical devices is proportional to their sizes, elongating the light-intensity control device in the main scanning direction is at a disadvantage because of its cost. However, as are the examples shown in FIGS. 18 and 19, by placing the light-intensity control devices closer to the side of the semiconductor lasers 111K and 111C than to the optical deflecting unit 117 in the optical paths, the sizes of the light-intensity control devices can be small, which provides a cost advantage.

As a result of comparison between the example in FIG. 18 and the example in FIG. 19, the latter one is at a disadvantage because of cost in terms of an increase in the number of light-intensity control devices and of an increase in its working process. However, as is the example in FIG. 3, if the light-use efficiencies are made to coincide with each other using a small number of light-intensity control devices, a variety of light-intensity control devices for light transmittance need to be prepared, which is at a disadvantage because of its cost. Therefore, either one of them is selected for use based on these comparisons. Allowing for these conditions, a combination as follows as a whole of the optical scanning device 8 can be used. The combination is such that, for example, as a light transmittance of the light-intensity control device, the beam LY in the image station 60Y is set to 70%, the beam LM in the image station 60M is set to 50%, the beam LC in the image station 60C is set to 60%, and the light-intensity control device for the beam LK in the image station 60K is not provided.

As a result of comparison between the examples shown in FIGS. 18 and 19 and the example shown in FIG. 20, as explained above, the latter one requires a larger light-intensity control device. However, in the latter one, the dustproof glass required for the optical scanning device is used as the light-intensity control device from the beginning. Therefore, an increase in cost due to an increase in the number of components and due to an increase in the number of assembling processes is suppressed, facilitation of assembly adjustment and improvement of adjustment precision of assembly are expected, and a change of an optical path length and a change in optical characteristics due to whether the light-intensity control device is placed therein are minimized. Furthermore, to pass the light beam having passed through the optical system through optical devices, control can be provided so as to accommodate variations in the transmittances and reflectances in all the optical devices included in the optical system.

The light-intensity-control-device switching unit is produced by applying the light-reducing coating and the low-reflection coating to both the incident plane and the exit plane or by selectively applying either one of them as appropriate. The structure may be such that the light-intensity-control-device switching unit 114K and/or the light-intensity-control-device switching unit 114C are arranged and the dustproof glass 120K and/or the dustproof glass 120C are set as the light-intensity-control-device switching units, according to the precision of the light intensity control by the respective light-intensity-control-device switching units, and according to limitation to positions in which the light-intensity-control-device switching units 114K and 114C are arranged.

The light-use efficiency is generally determined by optical characteristics of the optical devices that form the optical system, such as a divergence angle of light emitted from the light source, each transmittance of lenses, and reflectances of a polygon mirror and a return mirror. However, because these values have variations, a light flux reaching an image plane of a photosensitive element includes all kinds of variations, and thus, the light-use efficiency ranges widely. For example, if the divergence angle of the light emitted from the light source varies, then a rate of the light passing through the first aperture varies, and the light-use efficiency also varies.

Figure 21:
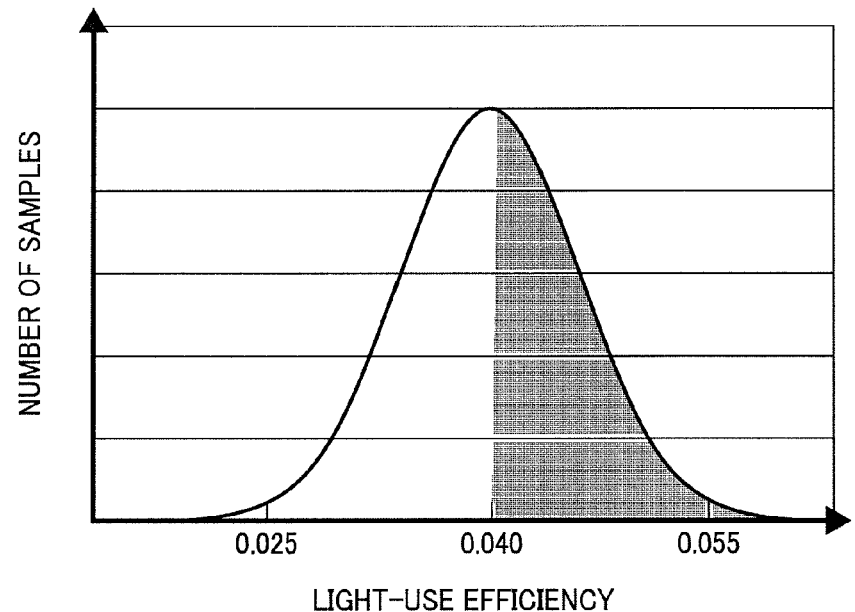
FIG. 21 is a graph of an example of variation in light-use efficiency of an ordinary optical scanning device.

FIG. 21 is a conceptual diagram of distribution of the light-use efficiency. FIG. 21 represents variations in the light-use efficiency for each ordinary optical scanning device. In this figure, the horizontal-axis represents light-use efficiency, and the vertical-axis represents the number of samples. Assuming that the light-use efficiencies of individual optical components can be expressed as a substantially normal distribution (Gaussian distribution), the light-use efficiencies of the entire optical scanning device are also expressed as the substantially normal distribution as shown in FIG. 21. It is noted that FIG. 21 shows a distribution like a Gaussian distribution in which a center value is 0.04, however, the center value is not necessarily limited thereto.

When the light-intensity control devices, such as the light-intensity-control-device switching units 114K, 114C (or the dustproof glasses 120K and 120C), are not used in the distribution in FIG. 21, and if a variation of 3σ is defined with respect to the center value in the normal distribution, a variation of the light-use efficiency is distributed within a range from 0.025 to 0.055. When the variation is within the range, a rate of the light-use efficiency of an optical scanning device with a highest light-use efficiency reaches 2.5 times as high as that of an optical scanning device with a lowest light-use efficiency. A light intensity required to expose the photosensitive element is determined irrespective of light-use efficiencies of the optical scanning devices. Therefore, if the light intensity is calculated together with the required light intensity, a light intensity range required for the light source is widened if the variation is high.

For example, when a light intensity required for the light source is 4 milliwatts to 8 milliwatts in the optical scanning device in which the light-intensity control device is not used and the center value of the light-use efficiency is 0.04, a light intensity required for a device of which light-use efficiency is 0.025 is 6.4 milliwatts to 12.8 milliwatts, and a light intensity required for a device of which light-use efficiency is 0.055 is 2.9 milliwatts to 5.8 milliwatts. Therefore, a required entire light intensity is 2.9 milliwatts to 12.8 milliwatts, which is a range from the maximum value to the minimum value. Assuming that the light intensity of the light source is set to a lowest light intensity and a light intensity to be emitted is reduced, if the light intensity to be emitted is too low, then this leads to degradation of image quality such as uneven density of an image caused by a decrease in droop characteristics.

Figure 22:
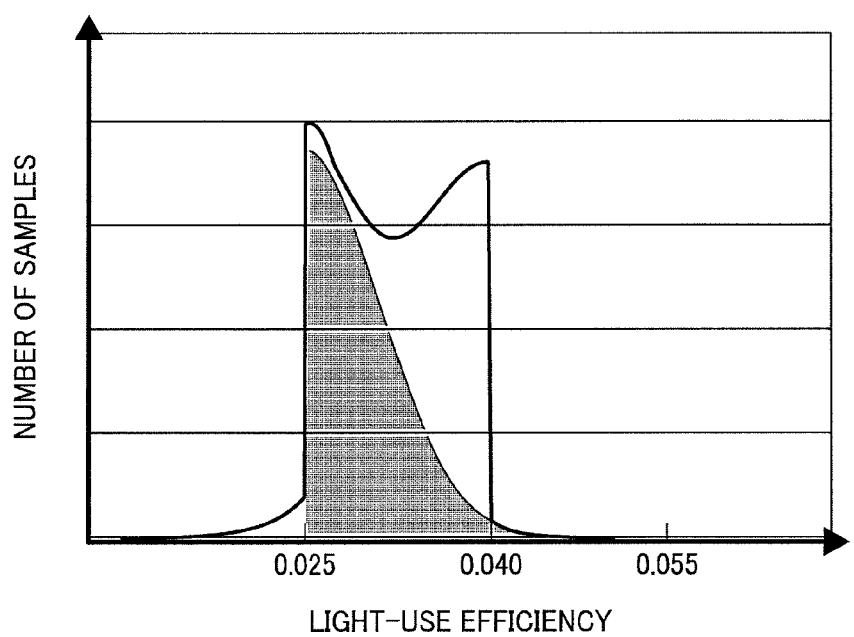
FIG. 22 is a graph of an example of variation in the light-use efficiency of the optical scanning device when the light-intensity control devices are used.

Therefore, it is considered that by placing a light-intensity control device that allows the light-use efficiency to decrease in the optical scanning device with the high light-use efficiency, a required minimum light intensity of the light source is increased and light emission of the light source is stabilized. In the distribution shown in FIG. 21, if a light-intensity control device with a transmittance of 62.5% is placed in the optical scanning device with a light-use efficiency of 0.04 or more, a distribution of light-use efficiency shown in FIG. 22 is obtained. In the example shown in FIG. 22, by placing the light-intensity control device in the optical scanning device with the high light-use efficiency, variations in the light-use efficiency can be suppressed in a range mainly from 0.025 to 0.04. Therefore, when an appropriate value in a range of the light intensity emitted from the light source to be used is 4 milliwatts to 13 milliwatts, by setting the range of a required light intensity to 4 milliwatts to 12.8 milliwatts by using the light-intensity control device and obtaining the distribution of the light-use efficiency as shown in FIG. 22, it is possible to suppress and prevent worsening of the droop characteristics, to obtain a high-quality image without uneven density.

Therefore, the light-intensity-control-device switching units 114K, 114C, 120K, and 120C are arranged as required so that the light-use efficiency falls within a first range in which the lowest light intensity of the light emitted from the semiconductor lasers 111K and 111C being the light sources is not caused to worsen the droop characteristics and a high-quality image without uneven density is obtained. Specifically, when light-use efficiency upon without arrangement of the light-intensity-control-device switching units 114K, 114C, 120K, and 120C is within a second range which is outside the first range, a light transmittance is selected so that the light-use efficiency upon arrangement thereof is within the first range according to the light-use efficiency, and they are arranged in the optical paths.

The first range is a range of values defined as a first ratio of first intensity of light beams emitted from the semiconductor lasers 111K and 111C to second intensity of the light beams as scanning lights. Specifically, the first intensity of the light beams indicates the light-use efficiency upon arrangement of the light-intensity-control-device switching units 114K, 114C, 120K, and 120C as required, while the light beams with the second intensity pass through the optical system and the light-intensity-control-device switching units 114K, 114C, 120K, and 120C arranged as necessary, and function as the scanning lights for scanning the photosensitive drums 20K and 20C. The first range is below, for example, 0.04. The second range is a range of values defined as a second ratio of third intensity of light beams emitted from the semiconductor lasers 111K and 111C to fourth intensity of the light beams as scanning lights. Specifically, the third intensity of the light beams indicates the light-use efficiency upon without arrangement of the light-intensity-control-device switching units 114K, 114C, 120K, and 120C, while the light beams with the fourth intensity pass through only the optical system, and function as the scanning lights for scanning the photosensitive drums 20K and 20C. The second range is, for example, 0.04 or more.

Accordingly, by arranging the light-intensity-control-device switching units 114K, 114C, 120K, and 120C based on the conditions, the lowest light intensity of each light emitted from the semiconductor lasers 111K and 111C is not caused to worsen the droop characteristics in each single image of the respective colors, and a high-quality image without uneven density is obtained. Moreover, as explained above, the light transmittances of the light-intensity-control-device switching units 114K, 114C, 120K, and 120C are selected so as to equalize the light-use efficiencies in the image stations, and the quality of an image with images of the respective colors superimposed one another is thereby improved.

The light beams emitted from the semiconductor lasers 111K and 111C are scattered caused by optical characteristics of the optical devices forming the optical system or by a fitting error or the like while passing through the optical system. The scattering of the light beams may be also caused by inclining the light-intensity-control-device switching units 114K, 114C, 120K, and 120C with respect to the optical axis of incoming light beams as explained later. The scattered light beams pass through the optical system and the light-intensity-control-device switching units 114K, 114C, 120K, and 120C, to become so-called ghost lights, and these lights scan the photosensitive drums 20K and 20C at positions different from original scanning positions. The ghost light becomes a direct factor to cause uneven density of images or images with streaks or to cause irregularities in images, and thus it is necessary to be avoided as much as possible. The scattered light also needs to be avoided as much as possible because it becomes disturbance when the intensities of the light beams emitted from the semiconductor lasers 111K and 111C are feedback-controlled and because it causes a decrease in variable amounts of light-use efficiency.

Therefore, in the light-intensity-control-device switching units 114K, 114C, 120K, and 120C, the light-reducing coating and the low-reflection coating are controlled so that the light transmittance T1 of the incident plane is different from the light transmittance T2 of the exit plane. The reason that the light transmittances are set to T1≠T2 is explained below.

Figure 23:
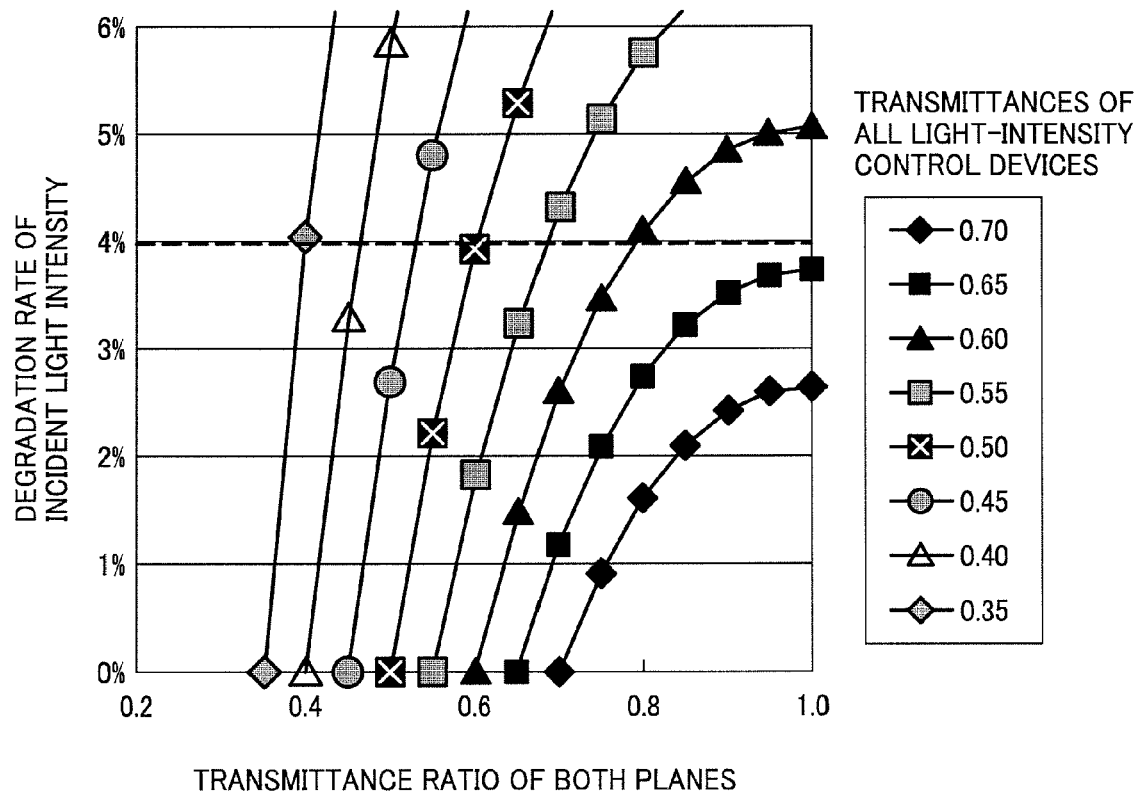
FIG. 23 is a correlation diagram between each ratio of light transmittances in entrance and exit planes of the light-intensity control devices and each degraded intensity of light entering the light-intensity control devices.

FIG. 23 represents a relationship between a transmittance ratio of lights in entrance and exit planes and a degradation rate of an incident light intensity in the light-intensity control devices such as the light-intensity-control-device switching units 114K, 114C, 120K, and 120C for each light transmittance of all the devices. The incident plane and the exit plane of the light-intensity control device form parallel planes with respect to a virtual plane perpendicular to an incident light. The transmittance ratio is a value obtained by dividing an amount of light transmittance of one plane, of the incident plane and the exit plane, in which a light transmittance is higher than that of the other plane by the light transmittance of the other plane. The degradation rate of an incident light intensity is a proportion of the sum of intensities of lights reflected by the incident plane and the exit plane of the light-intensity control device to the light intensity of light incident on the incident plane of the light-intensity control device.

It is understood from FIG. 23 that when the transmittance ratio is 1 or T1=T2, the degradation rate is the highest. Specifically, when T1=T2 (=0.708) in the light-intensity control devices in which the transmittance as the whole is 50%, the degradation rate is a maximum value of 8.5% which is outside the graph in FIG. 23.

Because the ghost light is desirably suppressed to 4% or less of the incident light intensity, as explained later, respective values of T1 and T2 are obtained from the conditions: $(1-T1)\cdot(1-T2)<0.04$, $T1\cdot T2=0.05$, and $T1 \neq T2$ which satisfy the above condition in the light-intensity control device with the same light transmission rate of 50%.

The respective values of T1 and T2 are obtained by, for example, R1=0.525 and R2=0.953 which satisfy the conditions using a reflectance $R1(=1-T1)$ of light reflected by the incident plane and a reflectance $R2(=1-T2)$ of light reflected by the exit plane. At this time, $R1 \cdot R2=(1-T1)\cdot(1-T2)=0.022$, and thus, the ghost light is a value below 2.2% of the incident light intensity.

Meanwhile, in the case shown in FIG. 23, assuming T1=T2, ones in which a proportion $(1-T1)\cdot(1-T2)$ of the ghost light is 0.04 which is a limit are light-intensity control devices in which a light transmittance $(=T1\cdot T2)$ as a whole is 64%. Therefore, when the limit of the proportion of the ghost light is 0.04, light-intensity control devices that suppress the ghost light can be obtained if the following expressions (4) and (5) are satisfied:

$$(1-T1)\cdot(1-T2)<0.04 \qquad (4)$$

and $$T1\cdot T2<0.64 \qquad (5)$$

Thus, uneven density and images with streaks can be satisfactorily suppressed, and excellent images can be obtained.

The reason that the limit i.e. the upper limit of the proportion of the ghost light is set to 0.04 is explained below. The ghost light due to one reflection on an optical plane through which light is supposed to originally pass is a conventional problem in optical devices such as a soundproof glass and a scanning lens which should have no power (see, for example, Japanese Patent Application Laid-open No. 2000-241867). A light intensity of the ghost light slightly increases and decreases depending on an incident angle of light or how a light is polarized. However, if a refractive index of a medium of the optical device is 1.5, then the light intensity of the ghost light is about 4% of the incident light intensity. Accordingly, the upper limit is set to 0.04.

To further suppress the irregularities in the image due to the ghost light, in the light-intensity-control-device switching units 114K, 114C, 120K, and 120C, at least one plane of the incident plane and the exit plane of the light beam is desirably inclined with respect to a virtual plane perpendicular to the optical axis of an incident light beam on the plane.

The reason is explained with reference to FIG. 8. In FIG. 8, reference numeral 125 represents the light-intensity control device corresponding to the light-intensity-control-device switching units 114K, 114C, 120K, and 120C, and reference numeral 126 represents the virtual plane. Reference numeral L1 represents a return light that is a reflected light reflected by the incident plane of the light-intensity control device 125 and is returned to the side of the light source. Reference numeral L2 represents a return light, of reflected lights reflected through the exit plane of the light-intensity control device 125, which passes through the incident plane and is returned to the side of the light source. Reference numeral L3 represents a light, of the reflected lights reflected through the exit plane of the light-intensity control device 125, which is further reflected by the incident plane, passes through the exit plane, and travels toward the image carrier. In the example shown in FIG. 8, the incident plane and the exit plane of the light beam are inclined at an angle θ with respect to the virtual plane 126 perpendicular to the optical axis of the light beam incident on these planes. In addition to the reflected lights L1 to L3, other scattered lights possibly occur, however, FIG. 8 shows only the typical reflected lights L1 to L3 that may affect images, and thus only these reflected lights are explained below.

The reflected light L3 acts as ghost light when it enters the image carrier. Therefore, the light-intensity control device 125 is placed by adjusting an angle θ so that the reflected light L3 does not enter the image carrier, and this prevents irregularities of an image due to the reflected light L3. In the light-intensity-control-device switching units 114K, 114C, 120K, and 120C shown in FIGS. 18, 19, and 20, an angle θ is set to, for example, 10 degrees. In the light-intensity-control-device switching unit 114K shown in, for example, FIG. 3, as explained above, T1 is set to 64.81% and T2 is set to 92.58%, and the reflected light L3 is suppressed to 2.6% of the incident light intensity, however, the angle θ is set to 10 degrees, and the reflected light L3 is thereby prevented from becoming the ghost light.

It is noted that the inclination of the angle θ causes a displacement of the light beam output from the light-intensity control device 125 with respect to the light beam incident on the light-intensity control device 125. Therefore, to cancel out the displacement, the position of the light source is slightly shifted, or parallel plates with a high transmittance in which a light intensity control function is ignorable are also set in place.

In the light-intensity control device 125, at least one of the incident plane and the exit plane of the light beam is simply inclined with respect to the virtual plane 126 so that the reflected light L3 will not be ghost light. Therefore, when the position of the light beam output from the light-intensity control device 125 is displaced or is inclined with respect to the light beam incident on the light-intensity control device 125, the position of the light source is slightly shifted, or parallel plates or the like with a high transmittance in which a light intensity control function is ignorable are also set in place so as to cancel out the displacement or the inclination.

To further suppress the irregularities in the image due to the ghost light, the light-intensity-control-device switching units 114K, 114C, 120K, and 120C satisfy T1>T2. The reason is explained below.

As shown in Table 3, there are a light-intensity control device A with (T1=0.9, T2=0.7) and a light-intensity control device B with (T1=0.7, T2=0.9) as the light-intensity control devices that satisfy the expressions (4) and (5), in which T1 and T2 are in an inverse relation. In the light-intensity control devices A and B, respective proportions of the light intensities of the reflected lights L1 to L3 or simply lights L1 to L3 with respect to the incident light intensities are as shown in Table 3.

TABLE 3

| | Light-intensity control device A | Light-intensity control device B |
|---|---|---|
| Transmittance T1 of incident plane | 0.9 | 0.7 |
| Transmittance T2 of exit plane | 0.7 | 0.9 |
| Light L1 | 0.1 | 0.3 |
| Light L2 | 0.243 | 0.049 |
| Light L3 | 0.0189 | 0.0189 |

As is understood from Table 3, the light intensities of the light L3 in the light-intensity control devices A and B are the same as each other, however, the light intensities of the lights L1 and L2 therein are largely different from each other. In the light-intensity control device A that satisfies T1>T2, the light L1 is lower than that of the light-intensity control device B in which T1<T2. In contrast, for the light L2, the two light-intensity control devices A and B are in an inverse relation. It is noted that the absorption of light in the light-intensity control devices A and B is not considered in values of the lights L1 to L3.

Both of the lights L1 and L2 can be disturbance when the light-intensity control unit 124 controls the light intensities emitted from the semiconductor lasers 111K and 111C, however, the light L1 more easily enter the light-intensity detecting units 122K and 122C as compared with the light L2, and the effect as disturbance is thereby large. This is because the optical path of the light L2 is displaced caused by refraction in the light-intensity control device 125. The intensity of the light L2 in the light-intensity control device A further lowers than the intensity of the light L1 in the light-intensity control device B, allowing for light absorption in the light-intensity control device 125.

Thus, in the light-intensity control device A that satisfies T1>T2, the control precision of the light intensities emitted from the semiconductor lasers 111K and 111C is higher than that of the light-intensity control device B in which T1<T2.

It is preferable that the semiconductor lasers 111K and 111C are surface-emitting lasers in terms of obtaining high-quality images at a high speed. As the surface-emitting laser, a vertical-cavity surface-emitting laser (VCSEL) is preferably used because a large number of light emitting points that emit light beams can be easily formed on a single device. This allows simultaneous writing to one image carrier with many light beams. If "n" light beams are used for simultaneous writing, an area where a latent image is formed becomes n times and a time required for image formation becomes one n-th as compared with a case in which writing is performed using a light source that emits a single light beam. Furthermore, writing density can also be enhanced while maintaining or improving a writing speed. Thus, the VCSEL is used as the light source to thereby obtain a high-quality image at a high speed.

The VCSEL has some disadvantageous characteristics as compared with an ordinary laser diode, however, these characteristics are resolved by the light-intensity control device. Specifically, in the ordinary laser diode used in optical scanning devices such as the optical scanning device 8, an output power range suitable for writing is about 4 milliwatts to 15 milliwatts, while in the VCSEL, the output power range is about 0.5 milliwatt to 1.2 milliwatts, and thus, achievement of a higher output power and an increase in the output power range are tasks to be solved. A low power can be dealt with by increasing the sensitivity of the photosensitive element. However, there is a case in which a lower-power light is required. In this case, if the VCSEL is used at a low power, a divergence angle of light becomes unstable, which causes uneven density or the like on an image. Besides, the output power range of the VCSEL is difficult to be increased in terms of the structure of the device.

However, if the light-intensity control device as explained above is used, an actual light intensity can be reduced while using the VCSEL at a high output power. For example, when a light intensity of 0.3 milliwatt is required, the characteristics may be decreased by emitting the VCSEL so as to obtain the light intensity of 0.3 milliwatt. However, by emitting the VCSEL so as to obtain a light intensity of 0.5 milliwatt at which the characteristics are not decreased and using the light-intensity control device with a transmittance of 0.6, the light intensity of 0.3 milliwatt is obtained as a result, and a stable image can be obtained.

The exemplary embodiment of the present invention is explained so far, however, the present invention is not limited to the particular embodiment. Therefore, various modifications and changes can be made within a scope of the present invention as described in appended claims unless otherwise specified.

For example, in the second embodiment, one light-intensity control device is placed in each optical path, however, two or more light-intensity control devices may be arranged in each optical path to optimize suppression of variation of the light-use efficiency. In this case, the light transmittances of the light-intensity control devices may be different from each other.

In the second embodiment, one optical scanning device is provided for all the image carriers, and only one optical scanning device is provided in the image forming apparatus. However, a plurality of optical scanning devices may be provided in the image forming apparatus in such a manner that one or more optical scanning devices are provided for one image carrier or a plurality of image carriers. In this case, also, the light-intensity control devices can be arranged in the optical scanning device as required according to output characteristics of the light source. If a plurality of light sources and image carriers are provided, light-intensity control devices can be arranged in the optical scanning device as required so as to equalize the light intensities of scanning lights. This allows formation of high-quality images in which uneven density is prevented or suppressed.

The image forming apparatus can be applied not only to a so-called tandem image forming apparatus, but also to a so-called one-drum image forming apparatus in which a color image is obtained by successively forming toner images of respective colors on one photosensitive drum and sequentially superimposing the toner images on one another. The image forming apparatus may also be one that can form only a mono-color image.

In the image forming apparatus of any one of the types, an intermediate transfer element is not used but toner images of respective colors may be directly transferred to a sheet such as the transfer sheet S. In this case, the toner images on a plurality of image carriers are directly transferred to the sheet during conveyance of the sheet by, for example, a conveyor belt.

The image forming apparatus does not have to be a multifunction product with functions of a copier, a printer, and a facsimile, but may be single units of these, or may be any other multifunction product with other combinations such as a multifunction product with a combination of a copier and a printer.

The effects described in the embodiments of the present invention are only examples of most preferable effects obtained from the present invention, and thus, the effects according to the present invention are not limited to these described in the embodiments of the present invention.

As described above, according to one aspect of the present invention, it is possible to provide the optical scanning device capable of controlling the exposure amount of the surface to be scanned according to the change using the light-intensity control device placed in the predetermined position even if the moving speed of the surface to be scanned is changed, and capable of contributing to formation of excellent images using the surface-emitting laser array as the light source.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a surface-emitting laser array including a plurality of surface-emitting laser devices arranged in an array;
an optical system including a plurality of optical devices to guide a light beam composed of lights emitted from the surface-emitting laser array to a target surface to be scanned;
a plurality of light-intensity control devices having different light transmittances; and
a light-intensity-control-device switching unit that places one of the light-intensity control devices at a predetermined position in an optical path of the light beam.

2. The optical scanning device according to claim 1, wherein
the optical devices include a coupling lens that couples the lights emitted from the surface-emitting laser array, and
at least either one of an incident plane and an exit plane of a light-intensity control device placed at the predetermined position by the light-intensity-control-device switching unit is inclined at a predetermined angle θ, where θ is not zero, with respect to a normal plane perpendicular to an optical axis of a light passing through the predetermined position along an optical axis of the coupling lens.

3. The optical scanning device according to claim 2, further comprising a scanning unit that scans the target surface with the light beam, wherein
the optical devices include a first aperture that has an opening for restricting a spot size of the light beam to guide the light beam to the scanning unit after reducing the spot size,
the predetermined position is a position adjacent to the first aperture, into which the light having passed through the first aperture proceeds, and
the predetermined angle θ satisfies $$\phi/d \leq \tan(2\theta)$$

where θ is diameter of the opening in a direction parallel to the normal plane on a plane through which the light passing through the predetermined position along the optical axis of the coupling lens passes making an angle between the light-intensity control device and the normal plane θ, and d is shortest distance from an edge of the opening to the light-intensity control device that is placed at the predetermined position on the plane along the optical path of the light beam.

4. The optical scanning device according to claim 2, wherein
the optical devices include a cylindrical lens through which the light beam passed through the light-intensity control device placed at the predetermined position passes,
the predetermined position is a position adjacent to the cylindrical lens, on which the light beam passed through the light-intensity control device placed at the predetermined position is incident,
the predetermined angle θ satisfies $$(a/2)/b \leq \tan(2\theta)$$

where a is diameter of the cylindrical lens on a plane through which the light passing through the light-intensity control device placed at the predetermined position along the optical axis of the coupling lens passes making an angle between the light-intensity control device and the normal plane θ, and b is distance from the light-intensity control device to the cylindrical lens following the light along the optical axis of the coupling lens from among lights passed through the light-intensity control device placed at the predetermined position.

5. The optical scanning device according to claim 1, wherein the optical devices include a second aperture that blocks a light reflected at the light-intensity control device placed at the predetermined position and traveling toward the target surface.

6. The optical scanning device according to claim 1, wherein the light-intensity-control-device switching unit includes
a holding member that holds the light-intensity control devices, and
a drive unit that drives the holding member in either one of a rotating manner and a parallel manner to place one of the light-intensity control devices at the predetermined position.

7. The optical scanning device according to claim 1, wherein the light-intensity-control-device switching unit places one of the light-intensity control devices corresponding to a moving speed of the target surface at the predetermined position.

8. The optical scanning device according to claim 1, wherein
the optical devices include an optical deflecting unit that deflects the light beam to scan the target surface with the light beam,
the optical deflecting unit is either one of a rotating polygon mirror having a plurality of reflecting surfaces and a vibrating device of which a reflecting surface vibrates, and
the optical deflecting unit changes a reflection cycle of the light beam according to a moving speed of the target surface.

9. The optical scanning device according to claim 1, wherein
the light-intensity-control-device switching unit selects a light-intensity control device having a light transmittance with which a first ratio between intensity of a light emitted from the surface-emitting laser array and intensity of a scanning light for scanning the target surface falls within a first range according to a second ratio between the intensity of the light emitted from the surface-emitting laser array and the intensity of the scanning light passing through the optical system and scanning the target surface when the second ratio is within a second range, and places selected light-intensity control device at the predetermined position, and
the light-intensity control device has a light transmittance T1 of an incident plane and a light transmittance T2 of an exit plane different from each other.

10. The optical scanning device according to claim 9, wherein T1 is higher than T2.

11. The optical scanning device according to claim 9, wherein at least one of the incident plane and the exit plane of the light-intensity control device is inclined with respect to a virtual plane perpendicular to an optical axis of a light incident on the plane.

12. The optical scanning device according to claim 9, wherein (1−T1)·(1−T2) is smaller than 0.04 and T1·T2 is smaller than 0.64.

13. The optical scanning device according to claim 9, wherein
the optical devices include an optical deflecting unit that deflects the light beam, and
the light-intensity-control-device switching unit places the light-intensity control device closer to the surface-emitting laser array than to the optical deflecting unit.

14. The optical scanning device according to claim 9, further comprising a dustproof member that prevents dust from entering the optical scanning device, wherein
the dustproof member functions as the light-intensity control device.

15. The optical scanning device according to claim 9, wherein
the target surface includes a plurality of target surfaces to be scanned, and
the light-intensity-control-device switching unit selects a light-intensity control device having a light transmittance with which a first ratio between intensity of a light emitted from the surface-emitting laser array and intensity of a scanning light for scanning the target surface falls within a first range according to a second ratio between the intensity of the light emitted from the surface-emitting laser array and the intensity of the scanning light passing through the optical system and scanning the target surface, corresponding to a target surface on which the second ratio is within the second range.

16. The optical scanning device according to claim 9, further comprising:
a light-intensity detecting unit that detects the intensity of the light emitted from the surface-emitting laser array; and
a light-intensity control unit that controls the intensity of the light emitted from the surface-emitting laser array based on the intensity detected by the light-intensity detecting unit in a feedback manner.

17. An optical scanning method for an optical scanning device that includes a surface-emitting laser array including a plurality of surface-emitting laser devices arranged in an array, an optical system including a plurality of optical devices to guide a light beam composed of lights emitted from the surface-emitting laser array to a target surface to be scanned, and a plurality of light-intensity control devices having different light transmittances, the optical scanning method comprising:
light-intensity-control-device switching including
selecting one of the light-intensity control devices, and
placing selected light-intensity control device at a predetermined position in an optical path of the light beam.

18. The optical scanning method according to claim 17, wherein
the selecting includes selecting a light-intensity control device having a light transmittance with which a first ratio between intensity of a light emitted from the surface-emitting laser array and intensity of a scanning light for scanning the target surface falls within a first range according to a second ratio between the intensity of the light emitted from the surface-emitting laser array and the intensity of the scanning light passing through the optical system and scanning the target surface when the second ratio is within a second range, and
the light-intensity control device has a light transmittance of an incident plane and a light transmittance of an exit plane different from each other.

19. An image forming apparatus comprising:
an optical scanning device that includes
a surface-emitting laser array including a plurality of surface-emitting laser devices arranged in an array, an optical system including a plurality of optical devices to guide a light beam composed of lights emitted from the surface-emitting laser array to a target surface to be scanned, a plurality of light-intensity control devices having different light transmittances, and a light-intensity-control-device switching unit that places one of the light-intensity control devices at a predetermined position in an optical path of the light beam;

a scanning unit that scans the target surface with the light beam; and an image carrier that forms the target surface on which a latent image is formed by the light beam scanned by the scanning unit.

20. The image forming apparatus according to claim 19, wherein the optical scanning device is provided in plurality.

* * * * *